(12) United States Patent
Son

(10) Patent No.: US 10,750,534 B2
(45) Date of Patent: Aug. 18, 2020

(54) METHOD AND APPARATUS TO RECEIVE AND TRANSMIT DATA IN A MOBILE COMMUNICATION SYSTEM

(71) Applicant: Yeongmoon Son, Yongin-si (KR)

(72) Inventor: Yeongmoon Son, Yongin-si (KR)

( * ) Notice: Subject to any disclaimer, the term of this patent is extended or adjusted under 35 U.S.C. 154(b) by 0 days.

(21) Appl. No.: 16/243,425

(22) Filed: Jan. 9, 2019

(65) Prior Publication Data

US 2019/0215861 A1    Jul. 11, 2019

Related U.S. Application Data

(60) Provisional application No. 62/615,431, filed on Jan. 9, 2018.

(51) Int. Cl.
| | |
|---|---|
| *H04W 4/00* | (2018.01) |
| *H04W 72/14* | (2009.01) |
| *H04L 27/26* | (2006.01) |
| *H04W 74/08* | (2009.01) |
| *H04L 5/00* | (2006.01) |
| *H04W 56/00* | (2009.01) |

(52) U.S. Cl.
CPC .......... *H04W 72/14* (2013.01); *H04L 5/001* (2013.01); *H04L 5/0092* (2013.01); *H04L 27/2601* (2013.01); *H04W 56/0005* (2013.01); *H04W 56/0045* (2013.01); *H04W 74/0833* (2013.01); *H04L 27/2602* (2013.01)

(58) Field of Classification Search
CPC ............ H04W 72/14; H04W 56/0045; H04W 56/0005; H04W 74/0833; H04L 5/0092; H04L 5/001; H04L 27/2601; H04L 27/2602
USPC .................................. 370/329, 330
See application file for complete search history.

(56) References Cited

U.S. PATENT DOCUMENTS

| | | | |
|---|---|---|---|
| 10,602,470 B2* | 3/2020 | Yoon | H04W 80/02 |
| 2019/0141697 A1* | 5/2019 | Islam | H04W 72/0413 |
| 2019/0191399 A1* | 6/2019 | Islam | H04W 56/005 |
| 2019/0261298 A1* | 8/2019 | Yoon | H04W 88/023 |

* cited by examiner

*Primary Examiner* — Chuong T Ho
(74) *Attorney, Agent, or Firm* — Novick, Kim & Lee, PLLC; Sang Ho Lee

(57) ABSTRACT

Data transfer method and apparatus for use in a mobile communication system are provided. Method to adjust uplink transmission timing includes receiving system information from a base station, receiving RRC message from the base station, receiving Timing Advance Command from the base station, determining N_TA and TAG for uplink timing adjustment and adjusting uplink transmission timing of the TAG according to N_TA.

10 Claims, 17 Drawing Sheets

METHOD AND APPARATUS TO RECEIVE AND TRANSMIT DATA IN A MOBILE COMMUNICATION SYSTEM

CROSS-REFERENCE TO RELATED APPLICATION

This application claims the priority and benefit of U.S. Provisional Patent Application No. 62/615,431, filed Jan. 9, 2018, the entire disclosure of which is incorporated herein by reference.

BACKGROUND OF THE INVENTION

1. Field of the Invention

The present disclosure relates to a mobile communication system with multiple subcarrier spacings. More specifically, the present disclosure relates to an uplink timing adjustment method and an apparatus for use in the mobile communication system with multiple subcarrier spacings.

2. Description of the Related Art

Mobile communication systems were developed to provide mobile users with communication services. With rapid technological advancements, the mobile communication systems have evolved to the level capable of providing high speed data communication service to support various QoS requirements.

In the mobile communication system called NR (Next Radio) which is being developed, to support various QoS requirement in various deployment scenarios, multiple subcarrier spacing need to be supported in a given serving cell, given frequency or given frequency bands.

OFDM based mobile communication systems so far use only a single subcarrier spacing and NR is the first mobile communication system using multiple subcarrier spacings. Therefore, a need exists for a method and an apparatus for facilitating uplink transmission timing adjustment in OFDM based mobile communication system with multiple subcarrier spacings.

SUMMARY

Aspects of the present disclosure are to address at least the above mentioned problems. Accordingly, an aspect of the present disclosure is to provide a method and an apparatus to adjust uplink transmission timing in OFDM based mobile communication system with multiple subcarrier spacings.

In accordance with an aspect of the present disclosure, an uplink transmission timing adjustment method is provided. In the method, UE receives system information from a base station to acquire sub-carrier spacing for preamble transmission, receives RRC message from the base station to acquire sub-carrier spacing of UL BWP, receives Timing Advance Command from the base station, determines N_TA based on subcarrier spacing and TA value, determines TAG for uplink timing adjustment and adjust uplink transmission timing of the TAG according to N_TA.

DETAILED DESCRIPTION

Figure 1A:
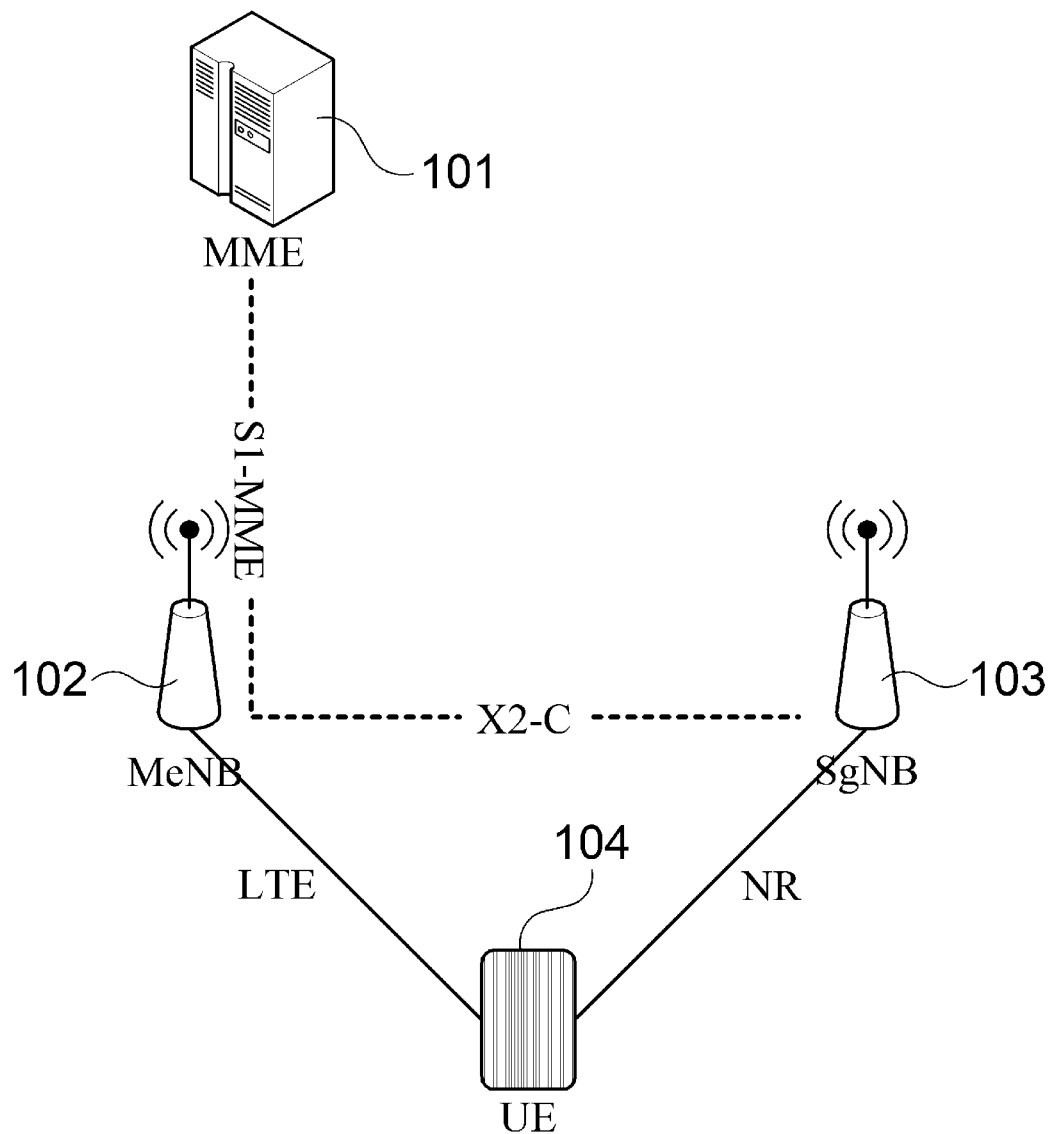
FIGS. 1A and 1B are diagrams illustrating a mobile communication system architecture according to various embodiments of the present disclosure.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

The following description with reference to the accompanying drawings is provided to assist in a comprehensive understanding of various embodiments of the present disclosures as defined by the claims and their equivalents.

Terminologies used in the disclosures are explained below. Numerology defines a specific time duration e.g. the length of an OFDM symbol. Numerology and subcarrier spacing (hereafter SCS) have one to one relationship. In LTE, SCS is 15 KHz and the length of an OFDM symbol is $1/14$ ms. In NR, SCS is either 15 KHz, 30 KHz, 60 KHz, 120 KHz or 240 KHz. The length of an OFDM symbol is inverse proportional to SCS. SCS, numerology and symbol length are corresponding each other and interchangeable in the disclosures. Subframe is time unit with 1 ms duration. Time slot (or slot) is time unit consisting with N symbols. N is either 7 or 14. Frame structure has same meaning as duplex mode. FS1 is FDD and FS2 is TDD.

Figure 1B:
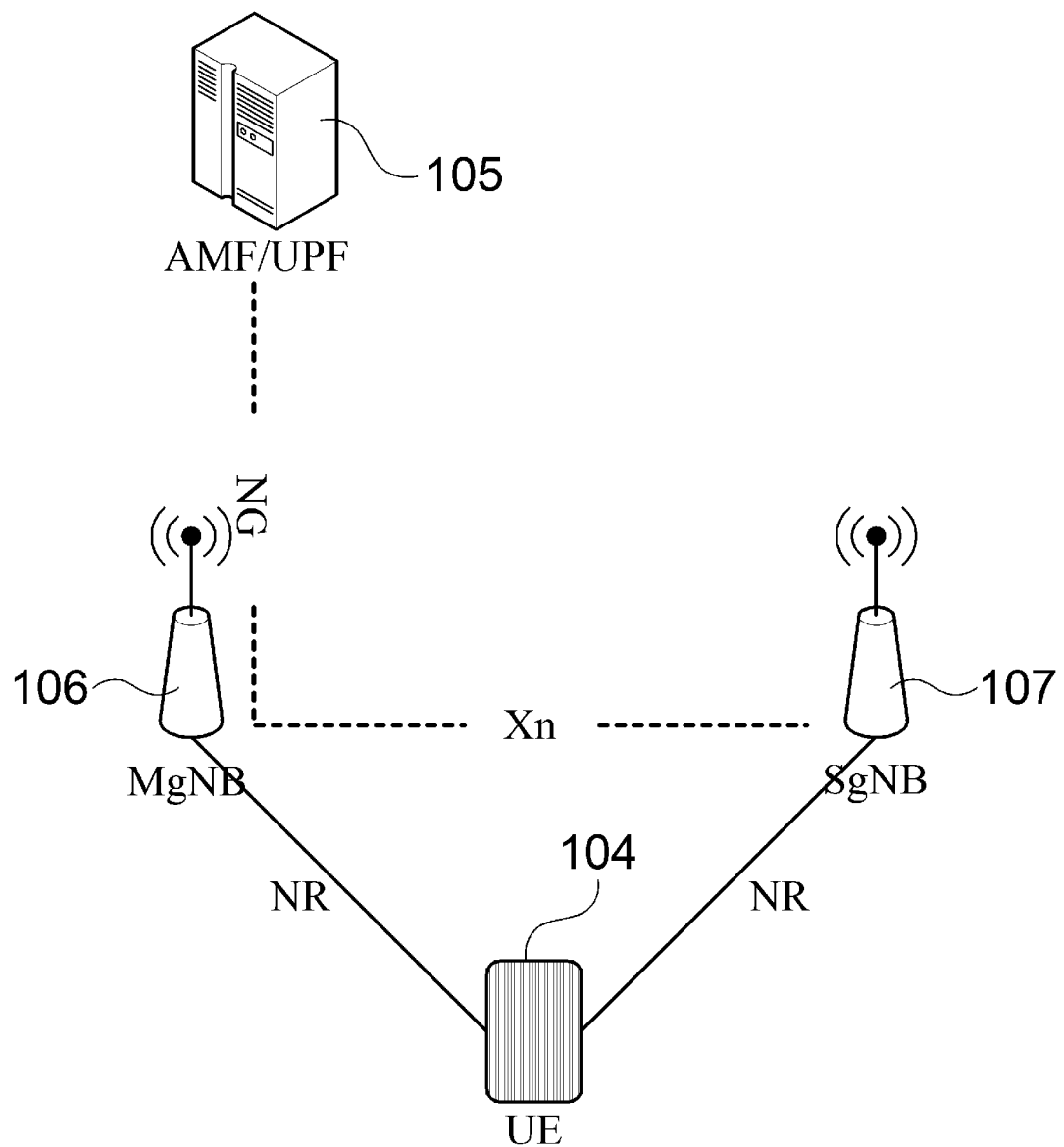

FIGS. 1A and 1B are diagrams illustrating a mobile communication system architecture according to various embodiments of the present disclosure.

Referring to FIGS. 1A and 1B, MME 101 is connected to MeNB 102 via S1 interface. SgNB 103 is connected to MeNB 102 via X2 interface. UE is connected to MeNB 102 and SgNB 103 via a specific radio interface/RAT. UE transmit and receive data with MeNB via a group of cells. The RAT of those cells is LTE/E-UTRA. The group of cells used for communication with MeNB is the 1st cell group (or Master Cell Group). UE transmit and receive data with SgNB via another group of cells. The RAT of those cells is NR. The group of cells used for communication with SgNB is the 2nd cell group (or Secondary Cell Group).

The mobile communication system explained above is called EN-DC (LTE NR Dual Connectivity). It is possible that UE is connected to only NR cells. AMF/UPF 105 is connected with MgNB 106 or with gNB via NG interface. The interface between gNBs is called Xn.

Referring to FIGS. 1A and 1B, base station is illustrated as a single node. In the real implementation, base station can be comprised of plurality of nodes. For example, a central unit and plurality of distributed unit can be comprised of a single base station and plurality of cells controlled by the base station.

Figure 2:
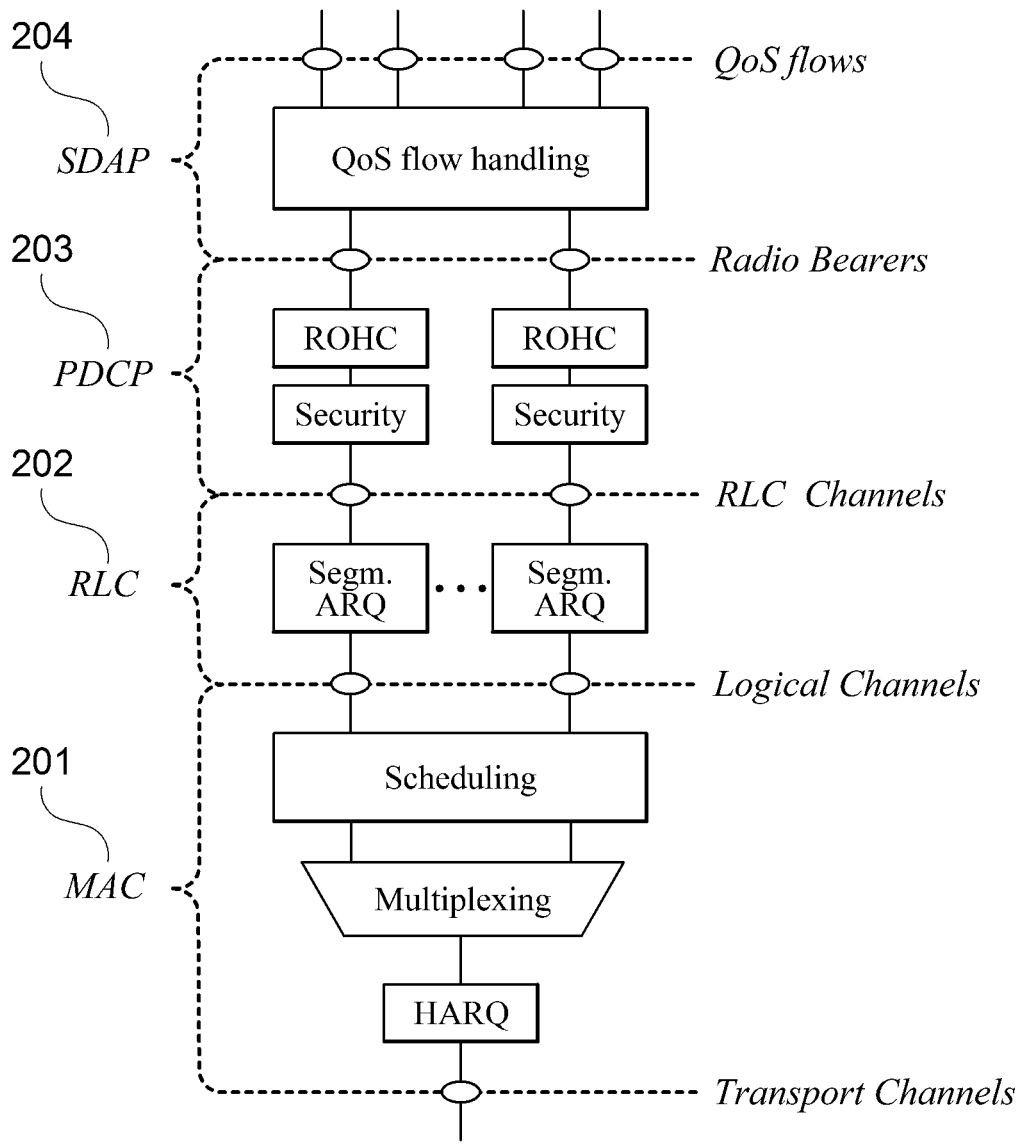
FIG. 2 is a diagram illustrating a protocol stack of a mobile communication system according to various embodiments of the present disclosure.

FIG. 2 is a diagram illustrating a protocol stack of a mobile communication system according to various embodiments of the present disclosure;

Referring to FIG. 2, Protocol stack of UE and base station is comprised of MAC 201, RLC 202, PDCP 203, SDAP 204. Multiple QoS flow/IP packet flows input to SDAP which distribute the IP packet to the appropriate PDCP. The RRC control message between UE and base station is exchanged via SRB (Signaling Radio Bearer). User data/IP packet between UE and base station is exchanged via DRB (Data Radio Bearer). Radio bearer is comprised of PDCP and RLC.

SDAP (Service Data Adaptation Protocol) layer handles QoS per data/service. More specifically, SDAP distribute IP packet received from the upper layer to the appropriate DRB. SDAP inspects SDAP header of the received SDAP PDU to apply reflective QoS. More details on reflective QoS can be found in TS 38.300.

PDCP (Packet Data Convergence Protocol) layer performs header compression/decompression, ciphering/deciphering and integrity protection. PDCP provides temporary lossless data transfer for the case where RLC cannot guarantee lossless data transfer.

RLC (Radio Link Control) layer process the RLC SDU received from PDCP to make the RLC PDU and submit it to the MAC layer. RLC layer performs ARQ (Automatic Retransmission Request) for RLC SDUs to ensure lossless data transfer.

MAC (Medium Access Control) layer multiplexes RLC PDUs, generated by multiple radio bearers configured in the UE, into MAC PDU and submit it to the physical layer. MAC layer demultiplexes RLC PDUs from MAC PDU and forward them to appropriate RLC entity. MAC performs specific operations required for data transfer with base station like random access or uplink timing adjustment.

Figure 3:
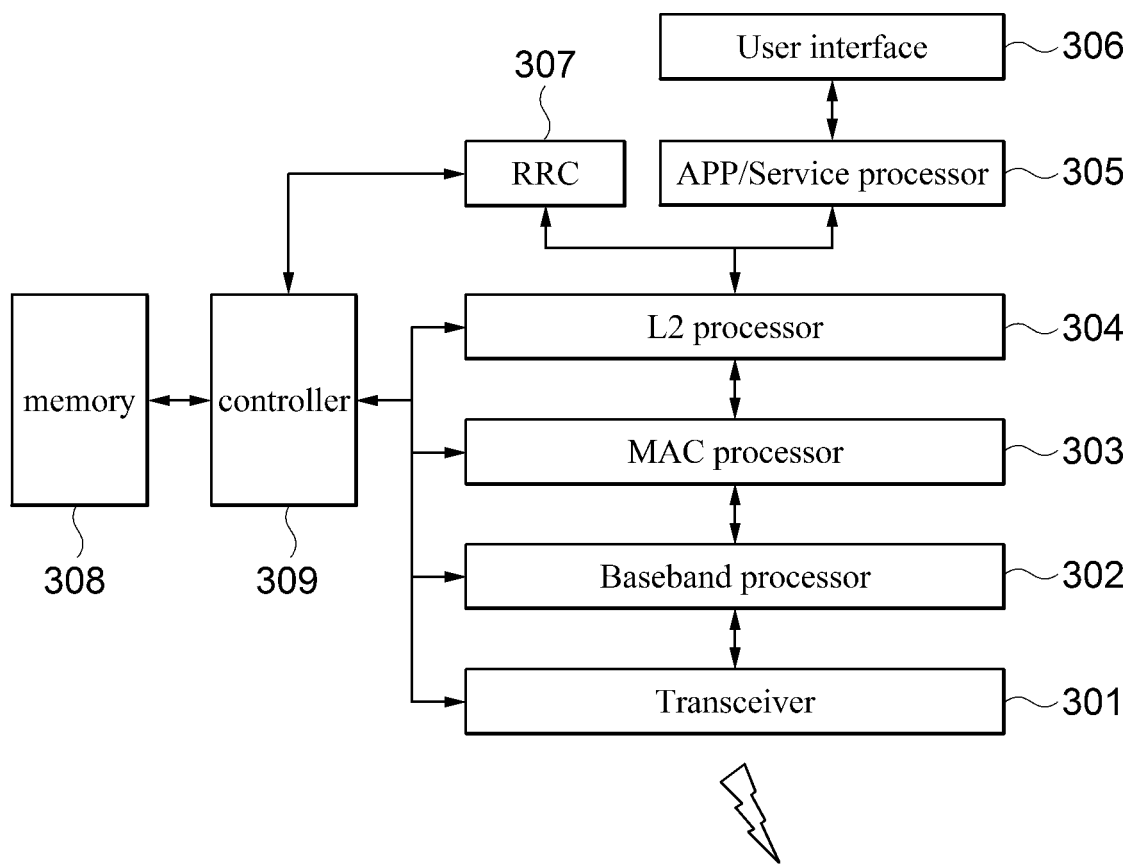
FIG. 3 is a block diagram illustrating a configuration of a terminal according to various embodiments of the present disclosure.

FIG. 3 is a block diagram illustrating a configuration of a terminal according to various embodiments of the present disclosure.

UE consists of transceiver 301, baseband processor 302, MAC processor 303, Layer 2 processor 304, Application/service processor 305, user interface 306, RRC processor 307, memory 308 and controller 309.

Transceiver process the signal received from baseband processor for transmission or process the received signal and forward it to baseband processor.

Baseband processor process (e.g. scrambling, channel coding, modulation etc) bit stream received from MAC processor to send it to transceiver or process the received the signal from the transceiver to forward it to MAC processor.

MAC processor multiplex RLC PDUs from L2 processor into MAC PDU or demultiplex MAC PDU to RLC PDUs to forward them to L2 processor. MAC processor forward MAC control element to controller or multiplex MAC control element into MAC PDU.

L2 processor consists of RLC processor and PDCP processor. L2 processor process RRC message from RRC processor into RLC PDU and process IP packet from application/service processor into RLC PDU, or vice versa.

Application/service processor processes the input from user interface and generate and forward IP packets to L2 processor for transmission. Application/service processor processes IP packets received from L2 processor and forward relevant to user interface.

User interface consist of display, virtual key board, speaker and microphone, and interact with user.

Memory stores necessary information forwarded from the controller and deliver necessary information to controller based on controller's instruction.

Controller controls the mobile communication in general. UE behavior/operation depicted in the FIGS. 5A-5D, 6A-6C, and 7A-7D are controlled by controller.

Figure 4:
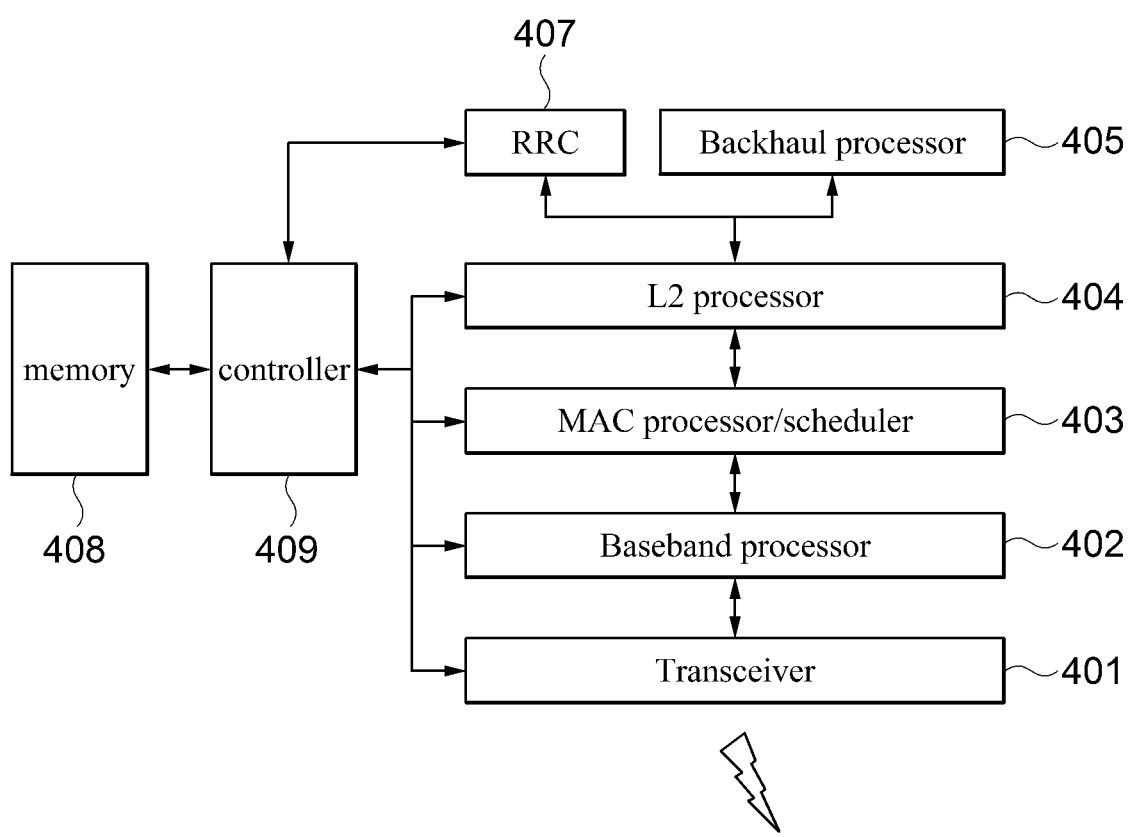
FIG. 4 is a block diagram illustrating a configuration of a base station according to various embodiments of the present disclosure.

FIG. 4 is a block diagram illustrating a configuration of a base station according to various embodiments of the present disclosure.

Node B consists of transceiver 401, baseband processor 402, MAC processor/scheduler 403, Layer 2 processor 404, backhaul processor 405, RRC processor 407, memory 408 and controller 409.

Transceiver process the signal received from baseband processor for transmission or process the received signal to forward it to baseband processor.

Baseband processor process (e.g. scrambling, channel coding, modulation etc) bit stream received from MAC processor to send it to transceiver or process the received signal from the transceiver to forward it to MAC processor.

MAC processor multiplex RLC PDUs from L2 processor into MAC PDU or demultiplex MAC PDU to RLC PDUs to forward them to L2 processor. It forward MAC control element to controller or multiplex MAC control element into MAC PDU.

Scheduler allocate resource to UEs in the cells controlled by the scheduler.

L2 processor consists of RLC processor and PDCP processor. L2 processor process RRC message from RRC processor into RLC PDU and process IP packet from backhaul processor into RLC PDU, or vice versa.

Backhaul processor communicate with core network node.

Memory stores necessary information forwarded from the controller and deliver necessary information to controller based on controller's instruction.

Controller controls the mobile communication in general. Node B behavior/operation depicted or implied in the FIGS. 5A-5D, 6A-6C, and 7A-7D are controlled by controller.

1$^{st}$ Embodiment

In a mobile communication system using OFDM, uplink transmissions from different UEs in a cell shall be synchronized such that those uplink signals arrive similar timing in Node B point of view. UE applies appropriate method amongst multiple methods depending on the given circumstances in adjusting uplink transmission timing.

Figure 5A:
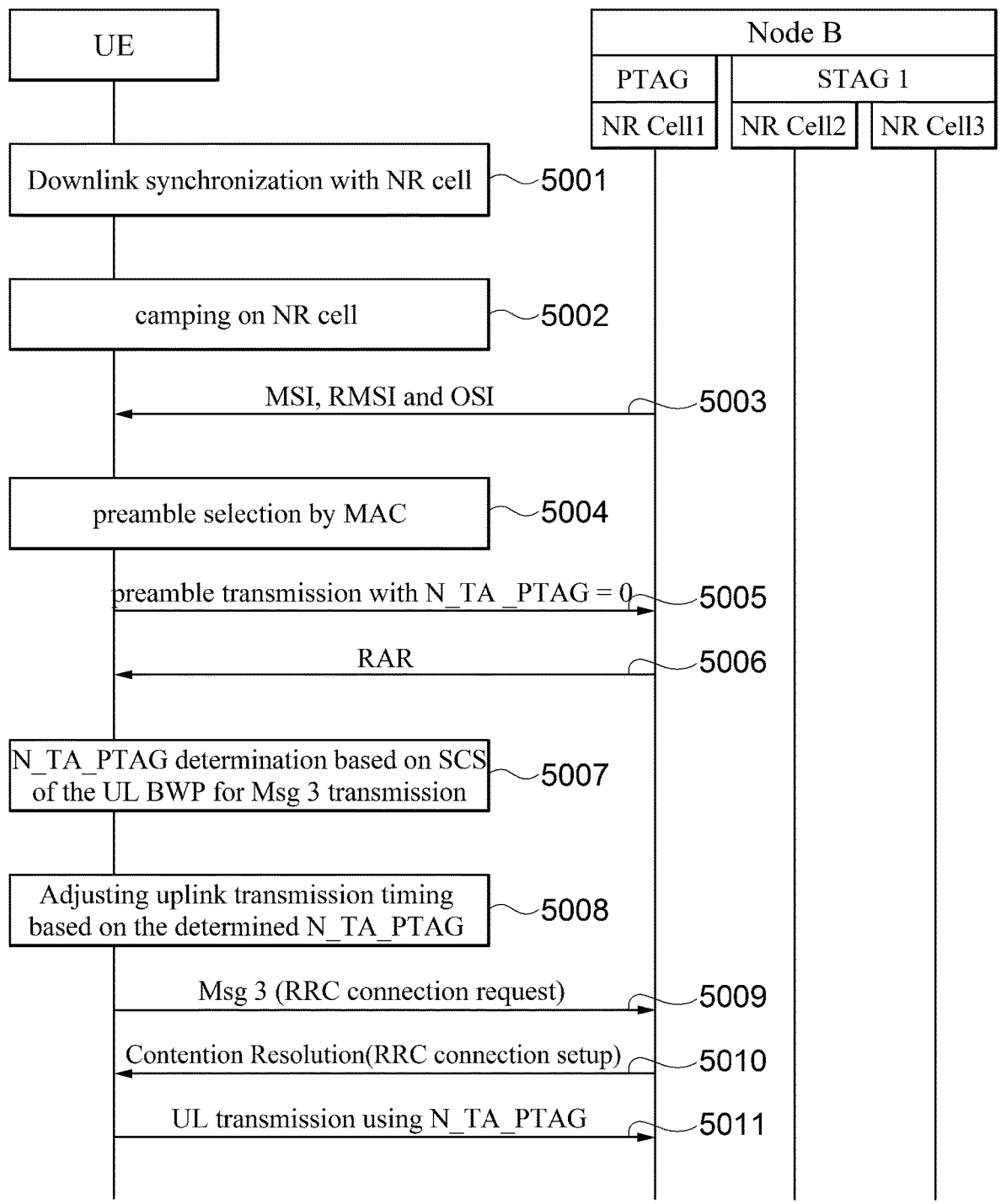
FIG. 5A is a signal flow diagram illustrating uplink transmission timing adjustment using the first method during the initial RRC connection setup procedure at a UE and base station in a mobile communication system according to the 1st embodiment of the present disclosure.

FIG. 5A is a signal flow diagram illustrating uplink transmission timing adjustment using the first method during the initial RRC connection setup procedure at a UE and base station in a mobile communication system according to the 1st embodiment of the present disclosure.

UE performs downlink synchronization with a NR cell. UE receives the primary synchronization signal (PSS) and secondary synchronization signal (SSS) to acquire time and frequency synchronization with a cell and to detect the physical layer Cell ID of that cell 5001.

UE camps on the NR cell if certain condition is fulfilled 5002. The condition includes whether the RSRP/RSRQ of PSS/SSS is above a certain threshold or better than that of the serving cell. Once UE camp on the NR cell, the NR cell becomes UE's serving cell.

UE receives system information from the NR cell 5003.

System Information (SI) is divided into MSI (Minimum SI) and OSI (Other SI). MSI is periodically broadcast and comprises basic information required for initial access and for acquiring OSI broadcast periodically or provisioned on-demand, e.g. scheduling information of OSI. The OSI encompasses everything not broadcast in MSI and may either be broadcast, or provisioned in a dedicated manner, either triggered by the network or upon request from the UE. MSI includes information required for random access procedure (RACH configuration information), which includes following information.

NumberofRA-Preambles, which indicates the number of common preambles that UE can randomly selects.

PRACH resource index, which indicates PRACH resource (time/frequency pattern of PRACH occasions) where UE can transmit preamble.

ra-ResponseWindow, which indicates the duration during which UE monitors PDCCH to receive RAR The system information also includes the following information.

Initial UL BWP configuration information, which indicates the UL BWP that can be used for Msg 3 transmission. It also indicates the SCS of the UL BWP for preamble transmission. SCS can be indicated by the integer denoted as mu. mu 0 is SCS of 15 KHz, 1 is of 30 KHz, 2 is of 60 KHz, 3 is of 120 KHz and 4 is of 240 KHz.

After some time, UE is required to establish RRC connection due to e.g. reception of paging message or need to perform tracking area update etc. To establish RRC connection, UE triggers random access.

UE selects preamble to perform random access procedure 5004.

There are two ways of selecting preamble. In the first way, UE select a ra-PreambleIndex randomly with equal probability from random access preambles indicated in the RACH configuration information and set PREAMBLE_INDEX to the selected ra-PreambleIndex. The preamble selected in the first way is called random preamble. In the second way, UE set the PREAMBLE_INDEX to the signalled ra-PreambleIndex in PDCCH order or in a RRC control message. The preamble selected in the second way is called dedicate preamble. Random access procedure with common/random preamble is called contention based random access procedure. Random access procedure with dedicate preamble is called contention free random access procedure.

UE determines the next PRACH occasion and transmits the preamble corresponding to PREAMBLE_INDEX on the PRACH occasion 5005. When transmitting the preamble UE sets uplink transmission timing (T_TA) according to the starting position of nth DL OFDM symbol. The n denotes the UL OFDM symbol number corresponding to the PRACH occasion associated with the selected downlink beam (or SS block). The OFDM symbol duration is determined by SCS. Hence the starting position of nth OFDM symbol is determined by the SCS of the initial UL BWP where preamble transmission takes place.

After transmitting preamble, UE starts the ra-ResponseWindow at the start of the first PDCCH occasion after a fixed duration of m symbols from the end of the preamble transmission. m is an integer stored in the UE memory.

UE monitors the PDCCH of the SpCell for Random Access Response identified by the RA-RNTI while the ra-ResponseWindow is running. RA-RNTI is determined in relation with PRACH occasion where preamble was transmitted.

UE receives a valid RAR 5006. If a downlink assignment has been received on the PDCCH for the RA-RNTI and the received TB is successfully decoded, and if the Random Access Response contains a Random Access Preamble identifier corresponding to the transmitted PREAMBLE_INDEX, UE consider the received RAR is the valid RAR and this Random Access Response reception successful. RAR includes following information.

Timing Advance Command: The Timing Advance Command field indicates the TA used to control the amount of timing adjustment that the MAC entity has to apply. The size of the Timing Advance Command field is 12 bits;

UL Grant: The Uplink Grant field indicates the resources to be used for the uplink transmission. Based on the UL grant in the valid RAR, UE performs UL transmission on a specific UL BWP of the serving cell where preamble was transmitted. The UL grant may include UL BWP identity. If the UL BWP identity is explicitly indicated in the RAR, UE performs UL transmission on the indicated UL BWP according to the UL grant in the RAR. If the UL BWP identity is not included in the RAR, UE performs UL transmission corresponding to the UL grant in the RAR in the same UL BWP where the preamble was transmitted (or in the UL BWP indicated as initialUplinkBandwidthPart in the system information or in a RRC message).

Temporary C-RNTI: The Temporary C-RNTI field indicates the temporary identity that is used by the MAC entity during Random Access. The size of the Temporary C-RNTI field is 16 bits.

UE determines T_TA using the first method 5007. In the first method, T_TA is determined based on Timing Advance Command and SCS of the UL BWP where Msg 3 will be transmitted (or SCS of the UL BWP where uplink transmission for the uplink grant received in RAR will occur or SCS of the initialUplinkBandwidthPart) and spectrum of UL BWP (whether TDD spectrum or FDD spectrum, or whether paired spectrum or unpaired spectrum).

UE adjust uplink transmission timing based on the determined T_TA 5008.

After successful contention resolution, the T_TA is applied to the uplink transmissions on the PCell. If SCells are configured afterward, uplink transmission timing of UL BWPs of SCells belonging to PTAG are also controlled by the T_TA determined in 5008 and maintained afterward.

UE transmits Msg 3 in the UL BWP indicated by the UL grant in RAR using the determined T_TA 5009. Msg 3 contains RRC connection request message. RRC connection request message includes following information.

S-TMSI which is UE identity allocated by the core network.

EstablishmentCause, which indicates the cause of RRC connection establishment.

Node B transmits Contention Resolution message and RRC connection setup message in a MAC PDU or in different MAC PDUs 5010.

RRC connection setup message include following information.

BandwidthPart-Config, which can include one or more instances of BandwidthPart information for downlink and one or more instances of BandwidthPart information for uplink. BandwidthPart information includes bandwidthPartId, frequency domain location (the starting position of BWP in frequency domain), bandwidth (the size of BWP in frequency domain), SCS of the BWP.

CORESET configuration information per DL BWP which indicates the frequency/time resource pattern where PDCCH can be transmitted/received. UE monitors PDCCH occasion (frequency/time resource for PDCCH) according to CORESET configuration.

First active DL BWP id and first active UL BWP id

All the UL BWPs of PCell belong to PTAG.

Contention Resolution message includes CR (Contention Resolution) MAC CE if Msg 3 contained CCCH SDU. CR MAC CE is the CCCH SDU (e.g. the RRC connection request message) transmitted in the Msg 3. UE considers contention resolution is successful when the received downlink message includes the RRC connection message it has transmitted (or CR MAC CE matches with the CCCH SDU it has transmitted in Msg 3).

After contention resolution, UE performs UL transmission toward PCell/PTAG applying/using determined T_TA 5011. The determined T_TA is applied to UL transmission for PCell and SCells of PTAG. In the disclosure it is called T_TA PTAG.

Figure 5B:
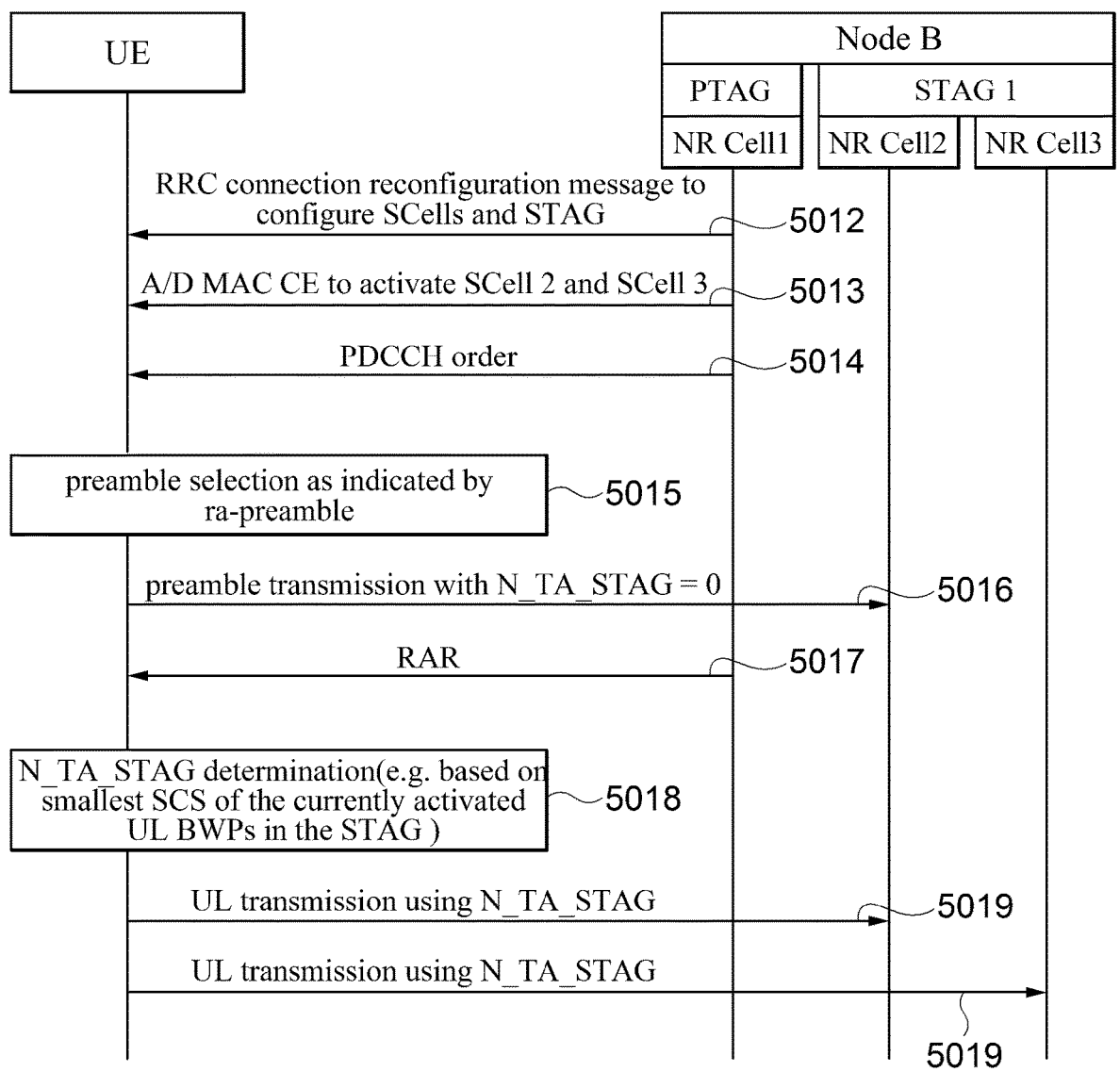
FIG. 5B is a signal flow diagram illustrating uplink transmission timing adjustment using the second method during the STAG addition procedure at a UE and base station in a mobile communication system according to the 1st embodiment of the present disclosure.

FIG. 5B is a signal flow diagram illustrating uplink transmission timing adjustment using the second method during the STAG addition procedure at a UE and base station in a mobile communication system according to the 1st embodiment of the present disclosure.

Node B can decide to configure UE with SCells to increase the data rate for the UE. Node B transmits RRC connection reconfiguration message to configure SCells 5012. The message instructs UE to configure SCells and STAG.

The message includes multiple instances of SCellConfig. SCellConfig is per SCell and has following information.
 ServingCellConfigDedicated, which includes configuration information of SCell and TAG id for the SCell.
 ServingCellConfigCommon which include rach-Config-Common (RACH configuration information for the SCell).
 BandwidthPart-Config of the SCell.

UE configures SCells as instructed by the network and transmit the response message to the network.

Newly added STAG (hereafter STAG 1) is not uplink synchronized yet and random access shall be performed before uplink transmission take place. For this end, node B first activate a SCell of the STAG 2 and trigger random access in the activated SCell.

UE receives, at subframe n of PCell, A/D MAC CE to activate SCell 2 and SCell 3 5013. UE starts to monitor PDCCH of the SCell 2 at subframe n+m+x and SCell 3 at subframe n+m+y. x denotes the first subframe where the PDCCH occasion of the first active DL BWP of the SCell 2 occurs and y denotes the first subframe where the PDCCH occasion of the first active DL BWP of the SCell 3 occurs. m denotes the number of subframes required for activating a SCell.

UE receives PDCCH order for SCell 2 5014.

PDCCH order is used to trigger random access in a specific serving cell. PDCCH order is DCI (Downlink Control Information) format 1 (DCI for PDSCH scheduling) with certain fields set to specific value (e.g. frequency resource information is set to all 1s). PDCCH order carries following information.
 Serving cell index which indicates the serving cell where random access shall be triggered.
 Preamble Index (ra-Preamble), which indicates the preamble index of dedicate preamble. If this field is set to all 0s. common preamble shall be used.

UE selects the preamble as indicated by ra-preamble if ra-preamble indicated in PDCCH order is not all 0s. UE selects the preamble randomly (preamble selected by MAC) if ra-preamble indicated in PDCCH order is all 0s 5015.

UE transmits the preamble 5016. When transmitting the preamble UE sets N_TA of the STAG 2 equal to 0.

UE receives valid RAR from the network 5017.

UE determines T_TA using the 1st or 2nd method 5018. If the ra-Preamble indicated in PDCCH order was all 0s (preamble was selected by the first way), 1st method is applied. If the ra-Preamble indicated in PDCCH order was not all 0s (dedicate preamble was selected by the second way), 2nd method is applied.

In the 2nd method, T_TA is determined based on the smallest SCS of UL BWPs of SCells of the TAG where preamble was transmitted (or random access is being performed). If an UL BWP is configured with two SCSs, smaller SCS is considered as the SCS of the UL BWP.

UE performs UL transmission in UL BWPs of SCells of STAG using the determined T_TA 5019.

Figure 5C:
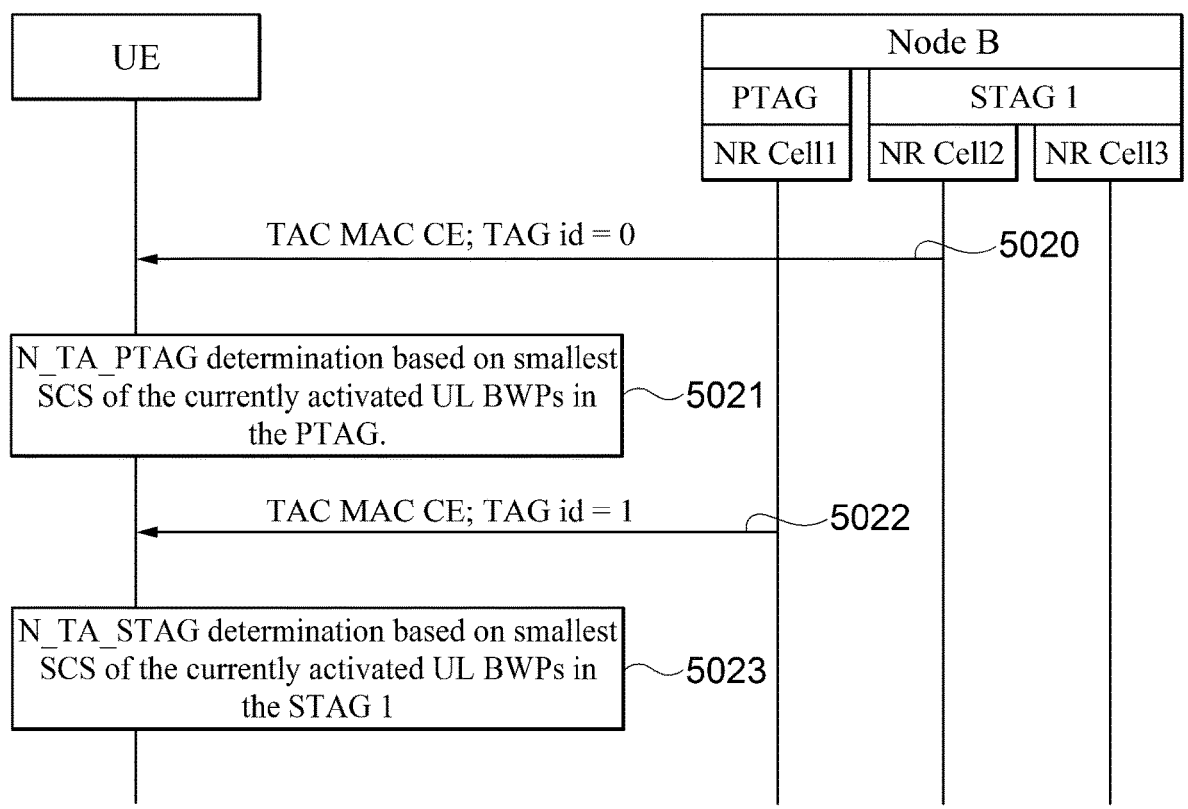
FIG. 5C is a signal flow diagram illustrating uplink transmission timing adjustment using the second method when TAC MAC CE is used at a UE and base station in a mobile communication system according to the 1st embodiment of the present disclosure.

FIG. 5C is a signal flow diagram illustrating uplink transmission timing adjustment using the second method when TAC MAC CE is used at a UE and base station in a mobile communication system according to the 1st embodiment of the present disclosure;

Node B can proactively adjust UE's uplink transmission timing by indicating the required amount of uplink timing adjustment in TAC (Timing Advance Command) MAC CE.

UE receives TAC MAC CE from node B 5020.

UE determines T_TA of a TAG using the 2nd method 5021. If TAG id is 0, T_TA is calculated based on smallest SCS of the PTAG.

UE receives TAC MAC CE from node B 5022.

UE determines T_TA of a TAG using the 2nd method 5023. If TAG id is 1, T_TA is calculated based on smallest SCS of the STAG 1.

Figure 5D:
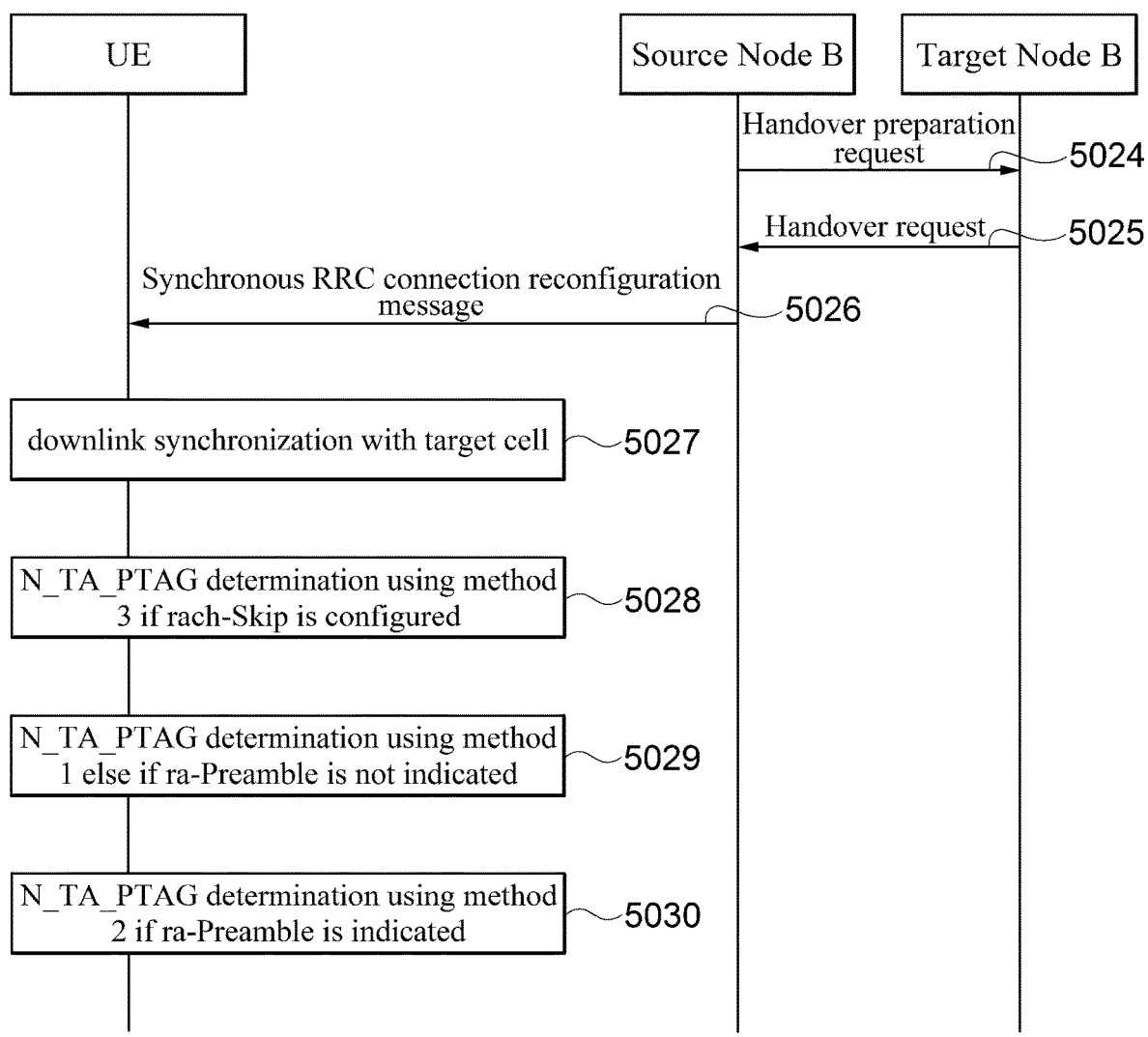
FIG. 5D is a signal flow diagram illustrating uplink transmission timing adjustment using the first, the second or the third method during handover at a UE and base station in a mobile communication system according to the 1st embodiment of the present disclosure.

FIG. 5D is a signal flow diagram illustrating uplink transmission timing adjustment using the first, the second or the third method during handover at a UE and base station in a mobile communication system according to the 1st embodiment of the present disclosure;

At some point of time, source node B decide handover toward a cell controlled by target node B. The decision can be made based on UE's channel quality, cell load situation or any other reason.

Source Node B sends Target Node B handover preparation request message 5024.

Handover preparation request message includes following information.
 measurement result reported from UE.
 List of Radio Bearers and their configuration.
 Required QoS (e.g. maximum/guaranteed data rate, target BLER . . . ).

Target Node B performs call admission control based on the information included in the Handover preparation request message.

If handover is accepted, Node B decides the configuration information to be used by the UE after handover.

The configuration information is included in the Handover Request message and sent to Source Node B 5025. Source Node B transmits the configuration information in RRCReconfiguration message to trigger handover 5026. The configuration information is included in reconfiguration-WithSync IE in RRCReconfiguration message. reconfigurationWithSync information includes target cell information, UE identity to be used in the target cell and configuration information that was generated by the target Node B. UE understand that handover is instructed upon receiving RRC message including reconfigurationWithSync information.

The configuration information includes either RACH-skip configuration information or RACH-configuration information. It can optionally include ra-preamble indicating dedicate preamble UE will use to perform random access in the target cell.

RACH-skip configuration information includes either one bit indication or TAG id. If RACH-skip configuration information is included in RRC reconfiguration with reconfigurationWithSync, UE does not perform RACH in the target cell and determines T_TA of the target PCell/PTAG according to RACH-skip configuration information and spectrum of the target PCell/PTAG. If one bit indicator is included in the RACH-skip configuration information, UE determines that N_TA of the PCell/PTAG after handover is zero. If TAG id is included, UE determines N_TA of the PCell/PTAG after handover is equal to N_TA of the indicated TAG immediately before the handover.

UE determines N_TA,offset based on the spectrums of the TAG. If PCell (in case of handover) or any serving cell of a TAG is unpaired spectrum (e.g. TDD spectrum), then N_TA, offset of PTAG/PCell or N_TA,offset of the corresponding TAG is non-zero and determined based on appropriate mu. If PCell (in case of handover) or all serving cells of a TAG are paired spectrum (e.g. FDD spectrum), then N_TA,offset of PTAG/PCell or N_TA,offset of the corresponding TAG is zero.

UE determines uplink transmission timing based on the determined N_TA and N_TA,offset.

UE performs downlink synchronization with the target NR cell 5027. If downlink synchronization was already established, this step can be skipped.

UE determines T_TA of PCell/PTAG using method 3 if rach-skip configuration was signaled 5028.

UE determines T_TA of PCell/PTAG using method 1 if rach-skip configuration was not signaled and dedicate preamble was not allocated (e.g. ra-Preamble was not signalled or ra-Preamble was all 0s or preamble was selected in the first way) 5029.

UE determines T_TA of PCell/PTAG using method 2 if rach-skip configuration was not signaled and dedicate preamble was allocated (e.g. ra-Preamble was not equal to all 0s or preamble was selected in the second way) 5030.

1st method, 2nd method and 3rd method to determine T_TA are described below with FIG. 10.

Figure 10:
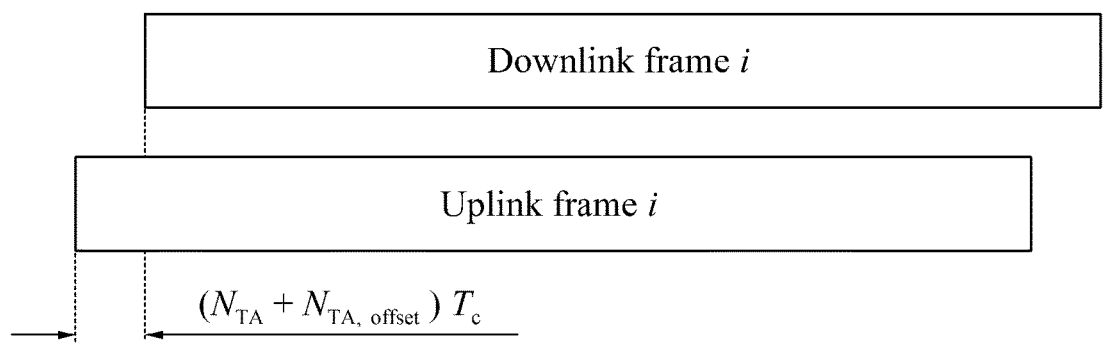
FIG. 10 is a diagram illustrating uplink and downlink frame.

FIG. 10 is a diagram illustrating uplink and downlink frame.

Downlink and uplink transmissions are organized into frames with 10 ms duration, consisting of ten subframes of 1 ms duration each. There is one set of frames in the uplink and one set of frames in the downlink on a carrier.

As shown in FIG. 10, UE shall transmits uplink frame i T_TA before the downlink frame i where T_TA (amount of transmission timing adjustment) is equal to (N_TA+N_TA, offset)*Tc. N_TA ($N_{TA}$) is an integer or a number to derive the amount of timing adjustment. In this application, $N_{TA}$ is notated as N_TA.

A same T_TA is applied to all the UL BWPs of all the serving cells of the same TAG. For example, if a TAG consists of serving cell 1 and serving cell 2. Serving cell 1 consists of UL BWP 1 and UL BWP 2. Serving cell 2 consists of UL BWP 3 and UL BWP 4. T_TA applied to the all UL BWPs of the TAG is determined by the same N_TA and the same N_TA,offset.

To determine T_TA of a TAG, one of three methods can be applied.

In the $1^{st}$ method, N_TA,offset is either 0 or 624*64/2^mu1 and N_TA is TA*16*64/2^mu1.

mu1 is determined by the SCS of the UL BWP where Msg 3 will be transmitted (or SCS of the UL BWP where UL transmission corresponding to the UL grant in RAR will be performed or SCS of the UL BWP indicated as initilUplinkBandwihtPart in System Information). TA is determined by Node B and indicated to UE in the RAR or in TAC MAC CE.

In the $2^{nd}$ method, N_TA,offset is either 0 or 624*64/2^mu2 and N_TA is either N_TA old+(TA−31)*16*64/2^mu3 (if TA is received in TAC MAC CE) or TA*16*64/2^mu3 (if TA is received in RAR).

Alternatively, mu4 instead of mu2 can be used in determining N_TA,offset.

Alternatively, mu3 instead of mu2 can be used in determining N_TA,offset.

mu2 is determined by the smallest SCS of all the configured UL BWPs of all the configured TDD SCells (configured with at least one uplink carrier and configured in unpaired spectrum) of the TAG. For example, if SCell 1(FDD) and SCell2(TDD) belong to STAG 1, and UL BWP 1 (SCS=15 KHz) and UL BWP 2 (SCS=30 KHz) are configured for SCell 1, and UL BWP 1 (SCS=60 KHz) and UL BWP 2 (SCS=120 KHz) are configured for SCell 2. Then mu2 is determined by the SCS of UL BWP1 of SCell2.

Alternatively, mu2 is determined by the smallest SCS of all the configured UL BWPs of all the activated TDD SCells (configured with at least one uplink carrier and configured in unpaired spectrum) of the TAG. In the example above, if only SCell 2 is activated, then mu is determined by SCS of UL BWP1 of SCell 2.

Alternatively mu2 is determined by the smallest SCS of all the activated UL BWPs of all the activated TDD SCells (configured with at least one uplink carrier and configured in unpaired spectrum) of the TAG. In the example above, if both SCell 1 and SCell 2 are activated, UL BWP 2 of SCell 1 is activated and UL BWP 1 of SCell 2 is activated, then mu is determined by SCS of UL BWP 1 of SCell 2.

mu3 is determined by the smallest SCS of all the configured UL BWPs of all the configured SCells (configured with at least one uplink carrier) of the TAG. For example, if SCell 1 and SCell belong to STAG 1, and UL BWP 1 (SCS=15 KHz) and UL BWP 2 (SCS=30 KHz) are configured for SCell 1, and UL BWP 1 (SCS=60 KHz) and UL BWP 2 (SCS=120 KHz) are configured for SCell 2. Then mu is determined by the SCS of UL BWP1 of SCell1.

Alternatively, mu3 is determined by the smallest SCS of all the configured UL BWPs of all the activated SCells (configured with at least one uplink carrier) of the TAG. In the example above, if only SCell 2 is activated, then mu is determined by SCS of UL BWP1 of SCell 2.

Alternatively, mu3 is determined by the smallest SCS of all the activated UL BWPs of all the activated SCells (configured with at least one uplink carrier) of the TAG. In the example above, if both SCell 1 and SCell 2 are activated, UL BWP 2 of SCell 1 is activated and UL BWP 1 of SCell 2 is activated, then mu is determined by SCS of UL BWP 2 of SCell 1.

mu4 is the mu previously used for N_TA,offset determination. mu4 being used means that once N_TA,offset is determined during handover or during RRC connection establishment, the determined one is used regardless of smallest SCS change. In this case, when mu1 is determined the mu1 is used as mu4 since then.

In the $3^{rd}$ method, N_TA,offset is either 0 or 624*64/2^mu2 and N_TA is either 0 or N_TA of a specific TAG which is different from this TAG.

Alternatively, mu4 instead of mu2 can be used in determining N_TA,offset.

Alternatively, mu for N_TA,offset determination can be signaled in the RRC reconfiguration message.

Figure 6A:
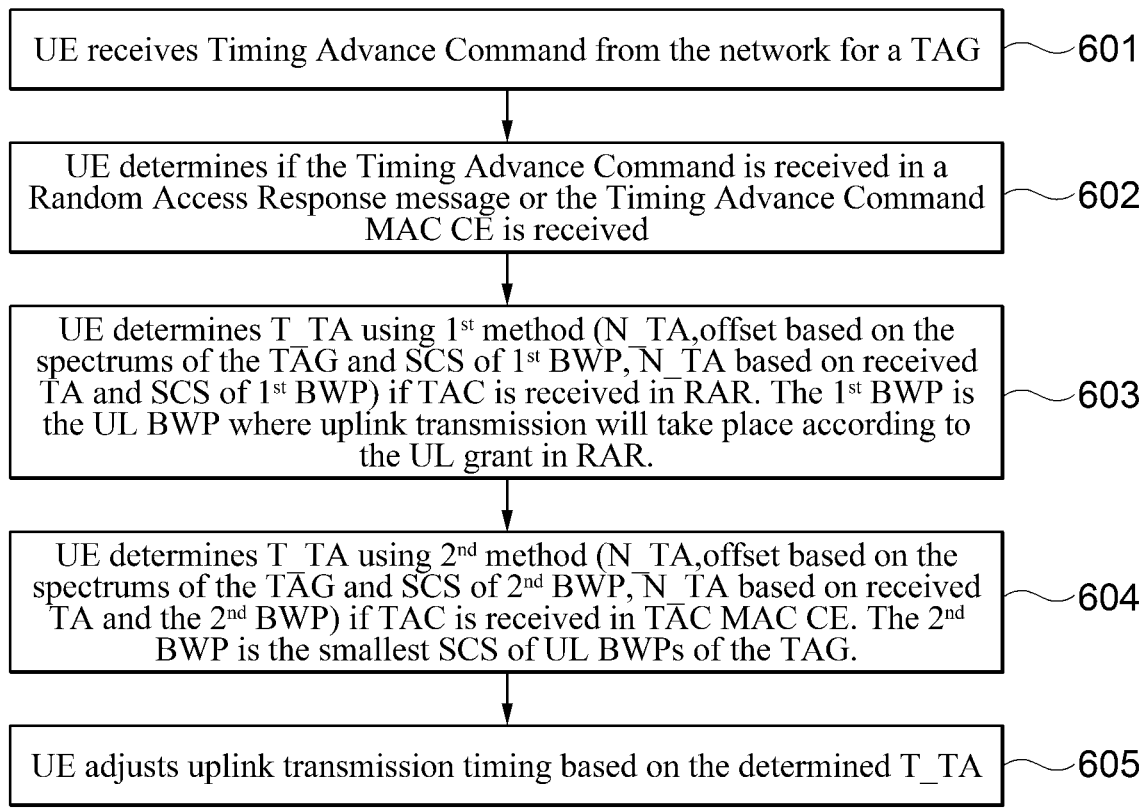
FIG. 6A is the block diagram illustrating uplink transmission timing adjustment of an UE using $1^{st}$ method or $2^{nd}$ method

FIG. 6A is the block diagram illustrating uplink transmission timing adjustment of a UE using $1^{st}$ method or $2^{nd}$ method UE receives Timing Advance Command from the network for a TAG 601.

UE determines if the Timing Advance Command is received in a Random Access Response message or the Timing Advance Command MAC CE is received 602.

UE determines T_TA using 1st method (N_TA,offset based on the spectrums of the TAG and SCS of 1st BWP, N_TA based on received TA and SCS of 1st BWP) if TAC is received in RAR. The 1st BWP is the UL BWP where uplink transmission will take place according to the UL grant in RAR 603.

UE determines T_TA using 2nd method (N_TA,offset based on the spectrums of the TAG and SCS of 2nd BWP, N_TA based on received TA and the 2nd BWP) if TAC is received in TAC MAC CE. The 2nd BWP is the smallest SCS of UL BWPs of the TAG 604.

UE adjusts uplink transmission timing based on the determined T_TA 605.

Figure 6B:
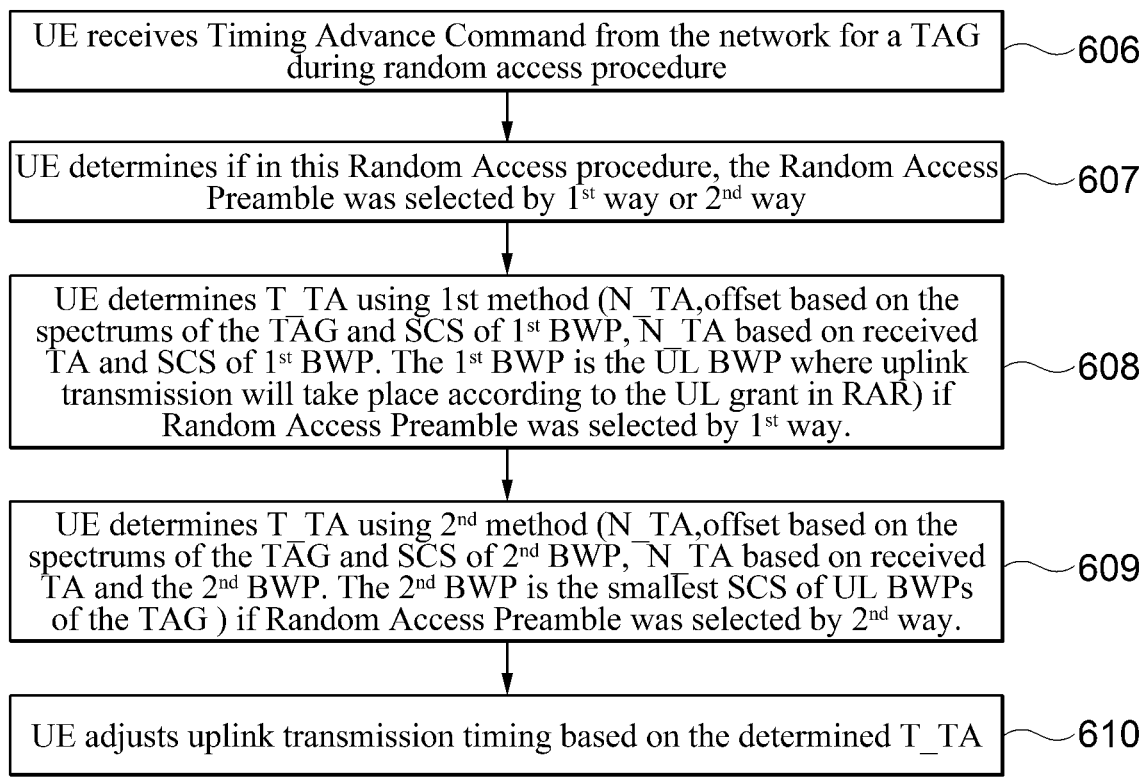
FIG. 6B is the block diagram illustrating uplink transmission timing adjustment of an UE upon random access procedure

FIG. 6B is the block diagram illustrating uplink transmission timing adjustment of an UE upon random access procedure UE receives Timing Advance Command from the network for a TAG during random access procedure 606.

UE determines if, in this Random Access procedure, the Random Access Preamble was selected by 1st way or 2nd way 607.

UE determines T_TA using 1st method (N_TA,offset based on the spectrums of the TAG and SCS of 1st BWP, N_TA based on received TA and SCS of 1st BWP. The 1st BWP is the UL BWP where uplink transmission will take place according to the UL grant in RAR) if Random Access Preamble was selected by 1st way 608.

UE determines T_TA using 2nd method (N_TA,offset based on the spectrums of the TAG and SCS of 2nd BWP, N_TA based on received TA and the 2nd BWP. The 2nd BWP is the smallest SCS of UL BWPs of the TAG) if Random Access Preamble was selected by 2nd way 609.

UE adjusts uplink transmission timing based on the determined T_TA 610.

Figure 6C:
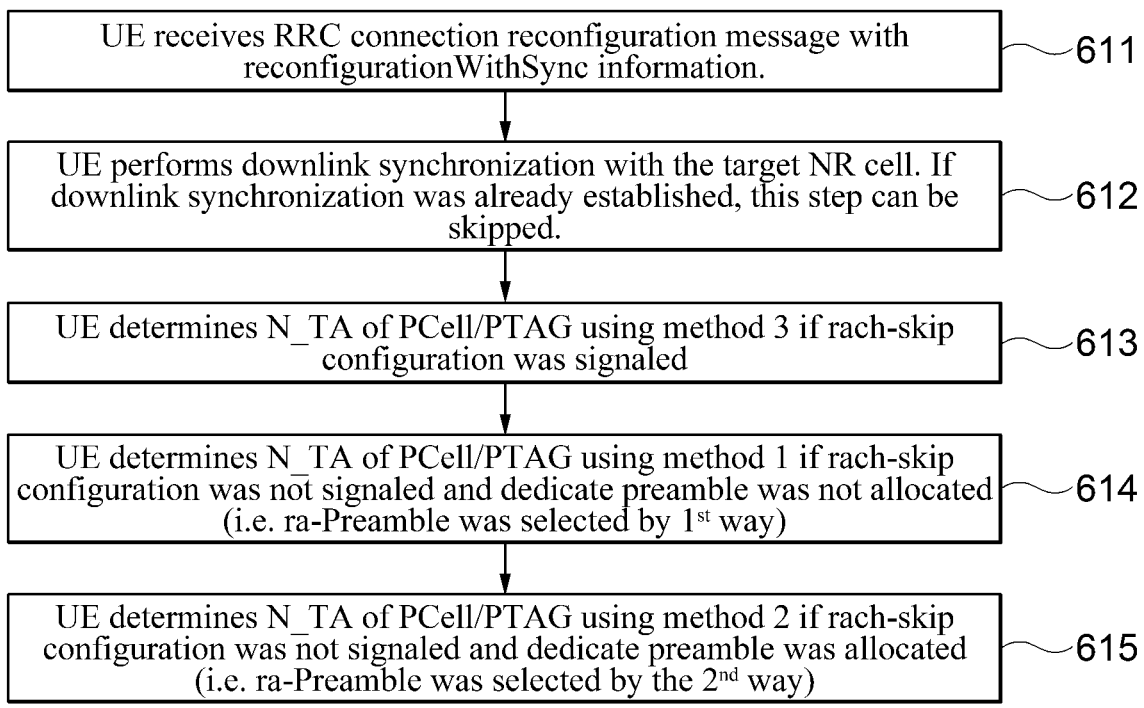
FIG. 6C is the block diagram illustrating uplink transmission timing adjustment of an UE during and after handover

FIG. 6C is the block diagram illustrating uplink transmission timing adjustment of an UE during and after handover.

UE receives RRC connection reconfiguration message with reconfigurationWithSync information 611.

UE performs downlink synchronization with the target NR cell. If downlink synchronization was already established, this step can be skipped 612.

UE determines N_TA of PCell/PTAG using method 3 if rach-skip configuration was signaled 613.

UE determines N_TA of PCell/PTAG using method 1 if rach-skip configuration was not signaled and dedicate preamble was not allocated (e.g. ra-Preamble was selected by $1^{st}$ way) 614.

In 615 UE determines N_TA of PCell/PTAG using method 2 if rach-skip configuration was not signaled and dedicate preamble was allocated (e.g. ra-Preamble was selected by the $2^{nd}$ way) 615.

$2^{nd}$ Embodiments

In this disclosure, methods and apparatus are present to select a proper random access procedure when DCI triggering random access procedure is received. UE selects a proper RA procedure among RA procedure 1, RA procedure 2 and RA procedure 3. RA procedure 1 is contention-based random access procedure which is used for transmitting uplink message like RRC message, Buffer Status Report or C-RNTI MAC CE. RA procedure 2 is contention free random access procedure which is triggered when dedicate preamble is allocated. RA procedure 3 is used for beam management where UE transmits preamble on the dedicate uplink resource allocated by Node B.

Figure 7A:
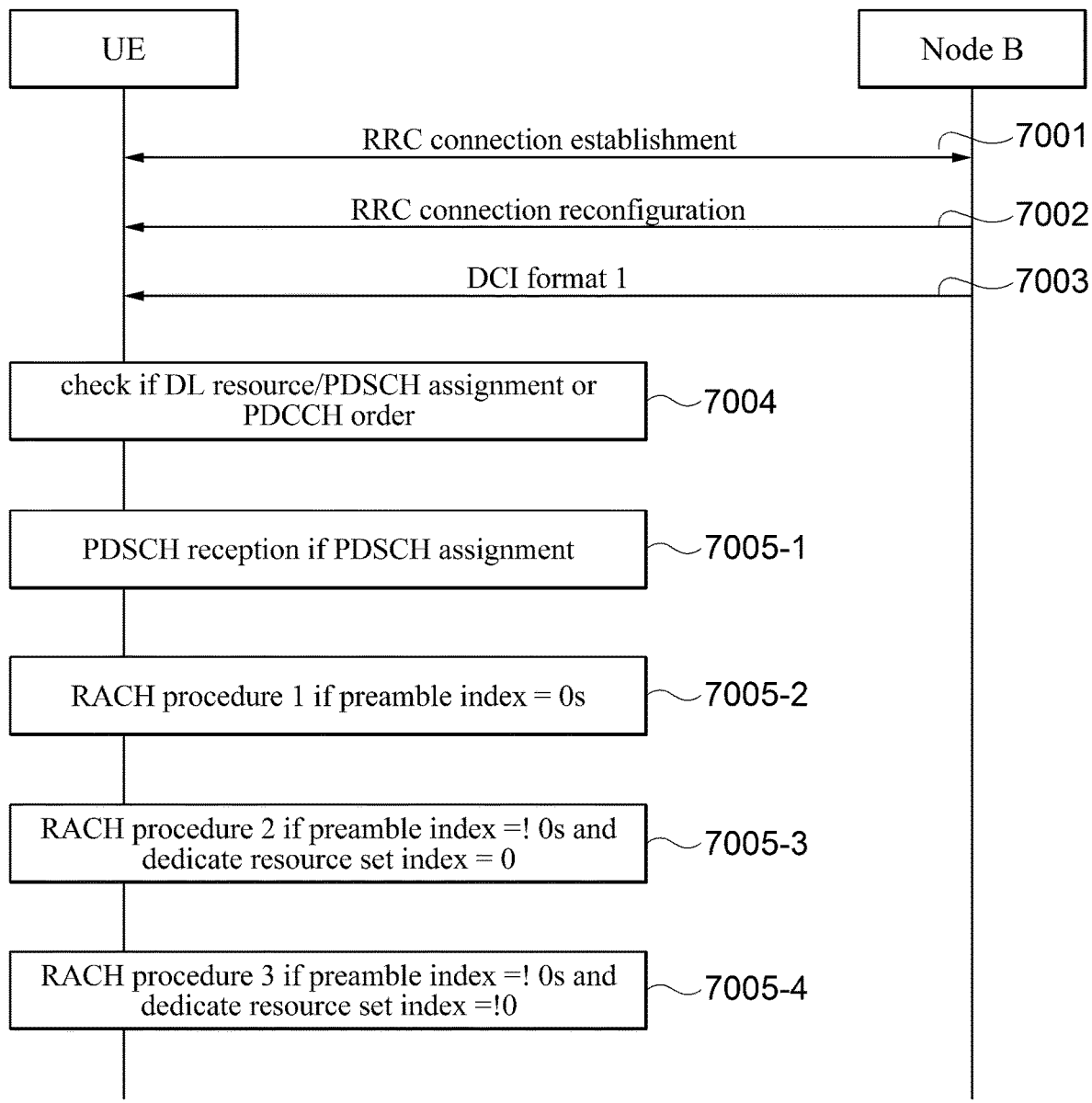
FIG. 7A is a signal flow diagram illustrating triggering random access procedure at a UE and base station in a mobile communication system according to the $2^{nd}$ embodiment of the present disclosure.

FIG. 7A is a signal flow diagram illustrating triggering random access procedure at a UE and base station in a mobile communication system according to the $2^{nd}$ embodiment of the present disclosure;

UE and Node B establishes RRC connection 7001. UE and Node B transmit and receive RRC messages via established RRC connection. During the RRC connection establishment procedure, C-RNTI is allocated to the UE.

Node B sends RRCReconfiguration message 7002. Node B can configure carrier aggregation using this message. A serving cell can be configured with supplemental uplink if the serving cell has uplink coverage problem. The message includes multiple instances of of SCellConfig. each SCell-Config include following information physCellId representing the SCell. It can be used for PDSCH scrambling or PUSCH scrambling SCellIndex which is a short identity of the SCell. It can be used in Activation/Deactivation MAC CE or as carrier indicator in DCI FrequencyInfoDL, which indicates the downlink carrier frequency of the SCell FrequenyInfoUL, which indicates the uplink carrier frequency of the SCell BandwithParts, which includes multiple instances of BandwidthPart-config for downlink and multiple instances of BandwidthPart-config for uplink DedicateResourceSetConfig, which includes multiple instances of DedicateResourceSet. Each DedicateResourceSet include following information.

DedicateResourceSetId (id 0 is reserved for the case where dedicate resource set is not allocated)

frequency domain dedicated resource e.g. PRB id(s)

time domain dedicate resource e.g. the number of consecutive slots (symbols) that can be used for dedicated resource time domain distance between PDCCH order and dedicate resource in terms of number of slots UE receives/detects DCI (e.g. when CRC check for the DCI is successful) on the PDCCH and the received DCI is DCI format 1 7003. DCI format 1 is either used for scheduling of PDSCH in a cell or for triggering RACH in a cell.

UE checks if received DCI format 1 is for PDCSH scheduling or for RACH triggering (e.g. PDCCH order) 7004. If DCI format 1 is used for PDCCH order, DCI format 1 including following fields.

Carrier Indicator, Bandwidth part indicator, Frequency domain resource assignment (all set to 1 or all but the first bit set to 1), time domain resource assignment (all set to 1), Preamble Index (ra-preamble), PRACH mask (indicating the PRACH resource that can be used for RA procedure 1 or RA procedure 2), Dedicate Resource Set id (indicating dedicate uplink resource for RA procedure 3), all remaining fields (e.g. NDI, HARQ process id, MCS, RV, TPC etc) are set to zero.

If the carrier indicated by carrier indicator is configured with supplemental uplink, the first bit of frequency domain resource assignment field is used for SUL indicator where 1 indicate the preamble is transmitted in SUL (UL indicated by supplementalUplink) and 0 indicates the preamble is transmitted in the normal UL (e.g. UL indicated by frequency-InfoUL)

If DCI format 1 is used for PDSCH scheduling, DCI format 1 including following fields.

Carrier Indicator, Bandwidth part indicator, Frequency domain resource assignment, time domain resource assignment, NDI, HARQ process id, MCS, RV, TPC etc UE receives PDSCH if the received DCI format 1 is for PDSCH scheduling 7005-1. UE receives PDSCH in PRB of DL BWP indicated by BWP id field at time instances indicated by time domain resource.

UE triggers RACH procedure 1 if the following conditions are met (if preamble is selected by $1^{st}$ way) 7005-2.

if the received DCI format 1 is PDCCH order; and if the ra-PreambleIndex has been explicitly provided by PDCCH; and if the ra-PreambleIndex is 000000 (e.g. common preamble is used; dedicate preamble is not allocated)

UE triggers RACH procedure 2 if the following conditions are met (if preamble is selected by $2^{nd}$ way and dedicate resource set is not indicated in the PDCCH order) 7005-3.

if the received DCI format 1 is PDCCH order; and
    if the ra-PreambleIndex has been explicitly provided by PDCCH; and
    if the ra-PreambleIndex is not 000000 (e.g. dedicate preamble is allocated for this random access); and
    if dedicate resource set id is 000 (e.g. dedicate resource set is not used/allocated for this random access)

UE triggers RACH procedure 3 if the following conditions are met (if preamble is selected by $2^{nd}$ way and dedicate resource set is indicated in the PDCCH order) 7005-4.

if the received DCI format 1 is PDCCH order; and
    if the ra-PreambleIndex has been explicitly provided by PDCCH; and
    if the ra-PreambleIndex is not 000000 (e.g. dedicate preamble is allocated for this random access); and
    if dedicate resource set id is not 000 (e.g. dedicate resource set is used/allocated for this random access)

Figure 7B:
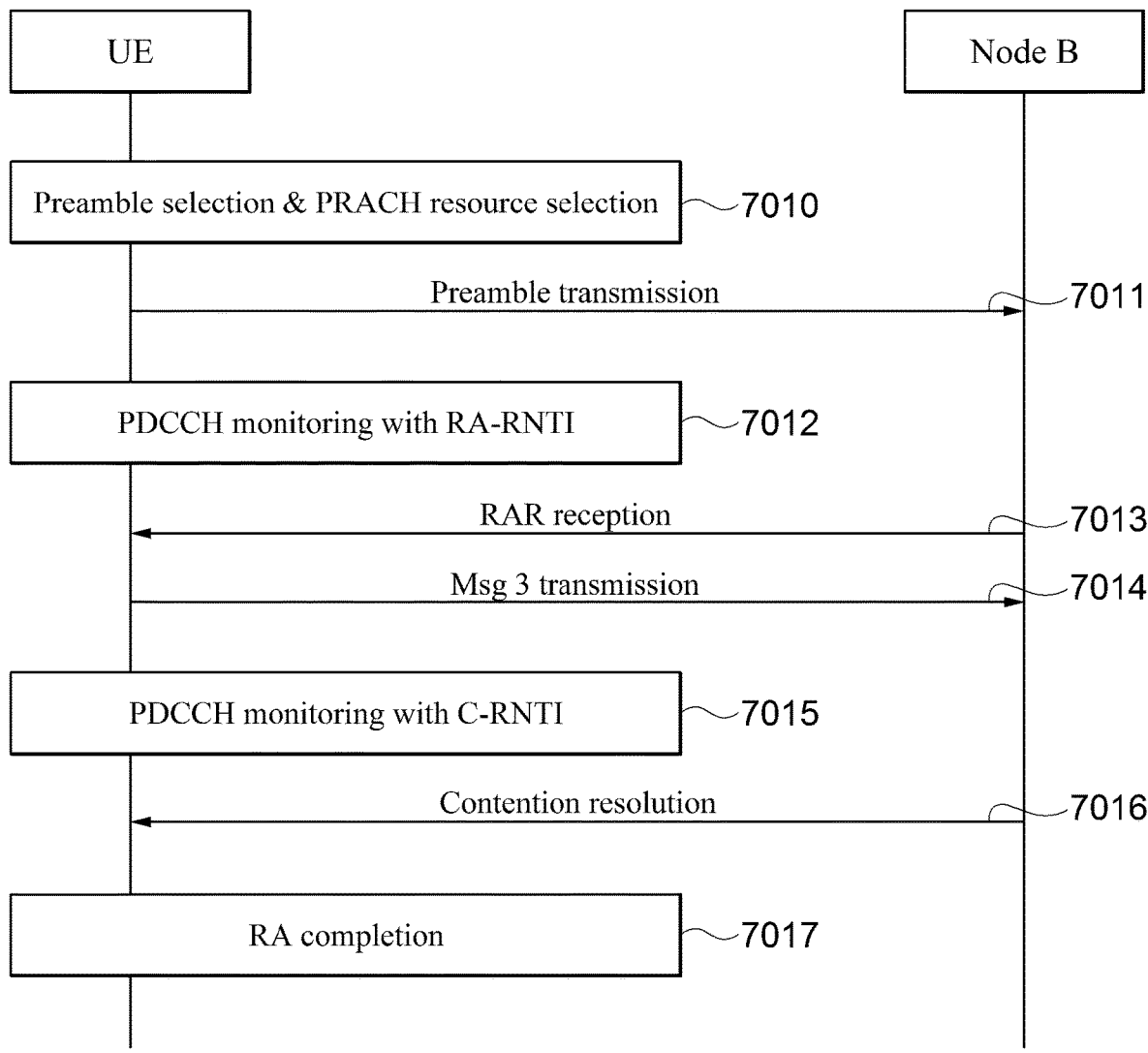
FIG. 7B is a signal flow diagram illustrating triggering random access procedure 1 at a UE and base station in a mobile communication system according to the $2^{nd}$ embodiment of the present disclosure.

FIG. 7B is a signal flow diagram illustrating triggering random access procedure 1 at a UE and base station in a mobile communication system according to the 2nd embodiment of the present disclosure;

UE selects preamble to perform random access procedure 7010. In the RA procedure 1, preamble is selected by MAC (e.g. random selection). The preambles that UE can use in RA procedure 1 are indicated in the system information. In other words, UE selects a ra-PreambleIndex randomly with equal probability from the random access preambles and set PREAMBLE_INDEX to the selected ra-PreambleIndex. UE determine the next available PRACH occasion according to the RACH-config in the system information or in SCell-Config. If SUL is configured for this SCell/Serving cell and SUL indicator in PDCCH order is 0, UE determines the next available PRACH occasion from the PRACH occasions of normal uplink. If the SUL indicator in PDCCH order is 1, UE determines the next available PRACH occasions from the PRACH occasions of supplemental uplink. UE determines the next available PRACH occasion from the PRACH occasions of UL BWP indicated in BWP id of PDCCH order UE transmit the preamble using the selected PRACH and PREAMBLE_INDEX 7011.

After transmitting preamble, UE starts the ra-ResponseWindow at the start of the first PDCCH occasion after a fixed duration of n symbols from the end of the preamble transmission. UE monitors the PDCCH of the SpCell for Random Access Response(s) identified by the RA-RNTI while the ra-ResponseWindow is running 7012. RA-RNTI is determined in relation with PRACH occasion where preamble was transmitted.

UE receives RAR 7013. If a downlink assignment has been received on the PDCCH for the RA-RNTI and the received TB is successfully decoded and if the Random Access Response contains a Random Access Preamble identifier corresponding to the transmitted PREAMBLE_INDEX, UE consider the received RAR is the valid RAR and this Random Access Response reception successful.

UE transmits Msg 3 in the UL BWP indicated by the UL grant in RAR 7014. Msg 3 contains C-RNTI MAC CE and Buffer Status Report.

Once Msg3 is transmitted, the UE shall start the ra-ContentionResolutionTimer and restart the ra-ContentionResolutionTimer at each HARQ retransmission and monitor the PDCCH while the ra-ContentionResolutionTimer is running 7015.

Node B transmits Contention Resolution message 7016. If the received Msg 3 contains C-RNTI MAC CE, Node B directly schedules the UE using C-RNTI, which is considered as contention resolution.

If PDCCH is received/detected, and if the PDCCH is addressed to the C-RNTI UE consider this contention resolution is successful.

In RA procedure 1, UE consider random access procedure is completed successfully upon successful contention resolution 7017.

Figure 7C:
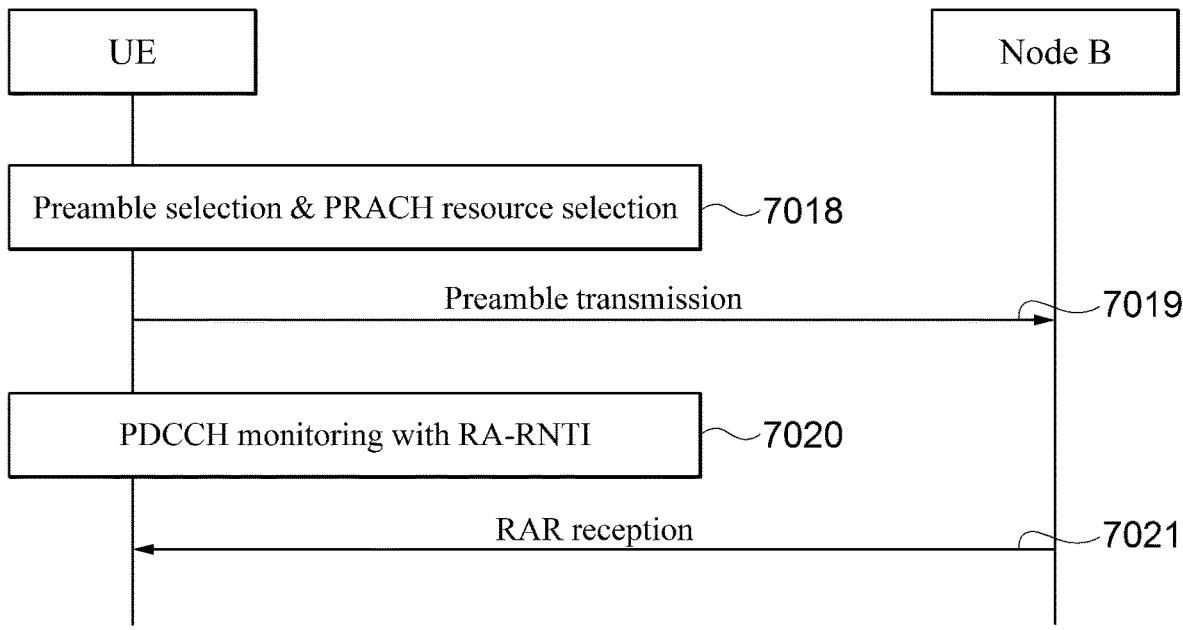
FIG. 7C is a signal flow diagram illustrating triggering random access procedure 2 at a UE and base station in a mobile communication system according to the $2^{nd}$ embodiment of the present disclosure.

FIG. 7C is a signal flow diagram illustrating triggering random access procedure 2 at a UE and base station in a mobile communication system according to the $2^{nd}$ embodiment of the present disclosure.

UE selects preamble to perform random access procedure 7018. In the RA procedure 2, dedicate preamble is selected or in other words, UE set the PREAMBLE_INDEX to the signalled ra-PreambleIndex in PDCCH order. UE determine the next available PRACH occasion.

UE transmit the preamble using the selected PRACH and PREAMBLE_INDEX 7019.

After transmitting preamble, UE starts the ra-ResponseWindow at the start of the first PDCCH occasion after a fixed duration of n symbols from the end of the preamble transmission. UE monitors the PDCCH of the SpCell for Random Access Response(s) identified by the RA-RNTI while the ra-ResponseWindow is running 7020. RA-RNTI is determined in relation with PRACH occasion where preamble was transmitted.

UE receives RAR 7021. If a downlink assignment has been received on the PDCCH for the RA-RNTI and the received TB is successfully decoded and if the Random Access Response contains a Random Access Preamble identifier corresponding to the transmitted PREAMBLE_INDEX, UE consider the received RAR is the valid RAR and this Random Access Response reception successful.

In RA procedure 2, UE consider random access procedure is completed successfully upon successful RAR reception.

Figure 7D:
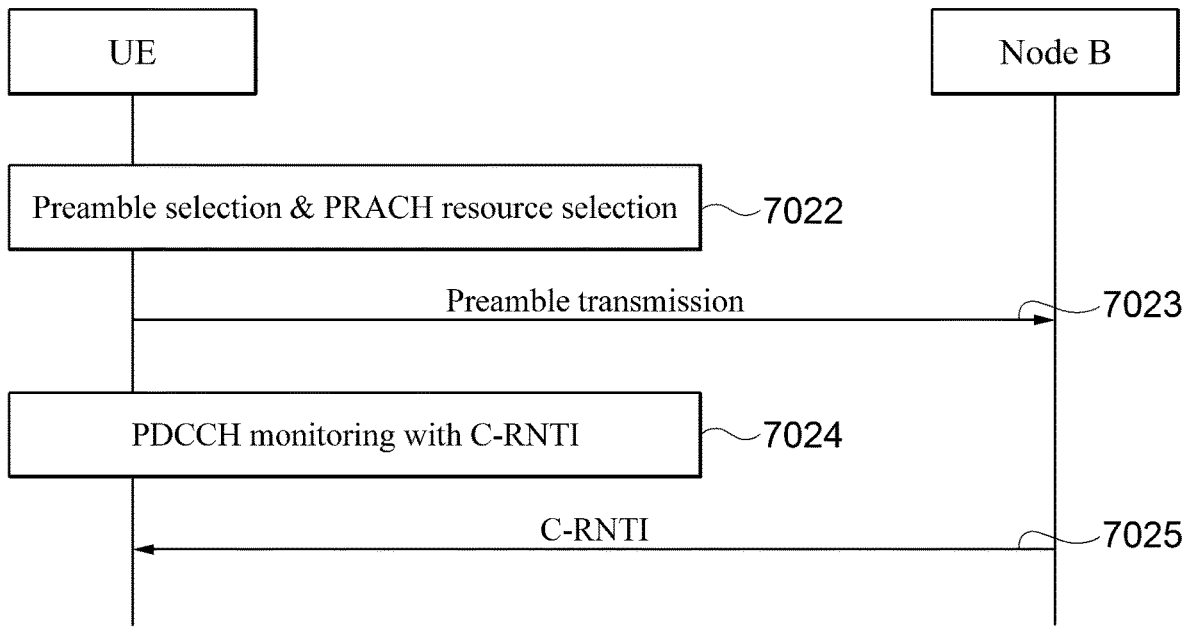
FIG. 7D is a signal flow diagram illustrating triggering random access procedure 3 at a UE and base station in a mobile communication system according to the 2nd embodiment of the present disclosure.

FIG. 7*d* is a signal flow diagram illustrating triggering random access procedure 3 at a UE and base station in a mobile communication system according to the $2^{nd}$ embodiment of the present disclosure.

UE selects preamble to perform random access procedure 7022. In the RA procedure 3, dedicate preamble is selected or in other words, UE set the PREAMBLE_INDEX to the signalled ra-PreambleIndex in PDCCH order. UE determine the frequency/time resource for preamble transmission based on the dedicated resource set id received in PDCCH order. UE selects a certain slot/symbol among slots/symbols of the dedicated resource set associated with the best downlink SSB (beam).

UE transmit the preamble using the selected time/frequency resource and PREAMBLE_INDEX 7023.

After transmitting preamble, UE starts the bfr-ResponseWindow at the start of the first PDCCH occasion after a fixed duration of m symbols from the end of the preamble transmission. UE monitors the PDCCH of the SpCell to receive PDCCH addressed by C-RNTI while bfr-ResponseWindow is running 7024.

UE receives PDCCH addressed by C-RNTI 7025. UE considers the random access procedure is completed successfully.

Figure 8:
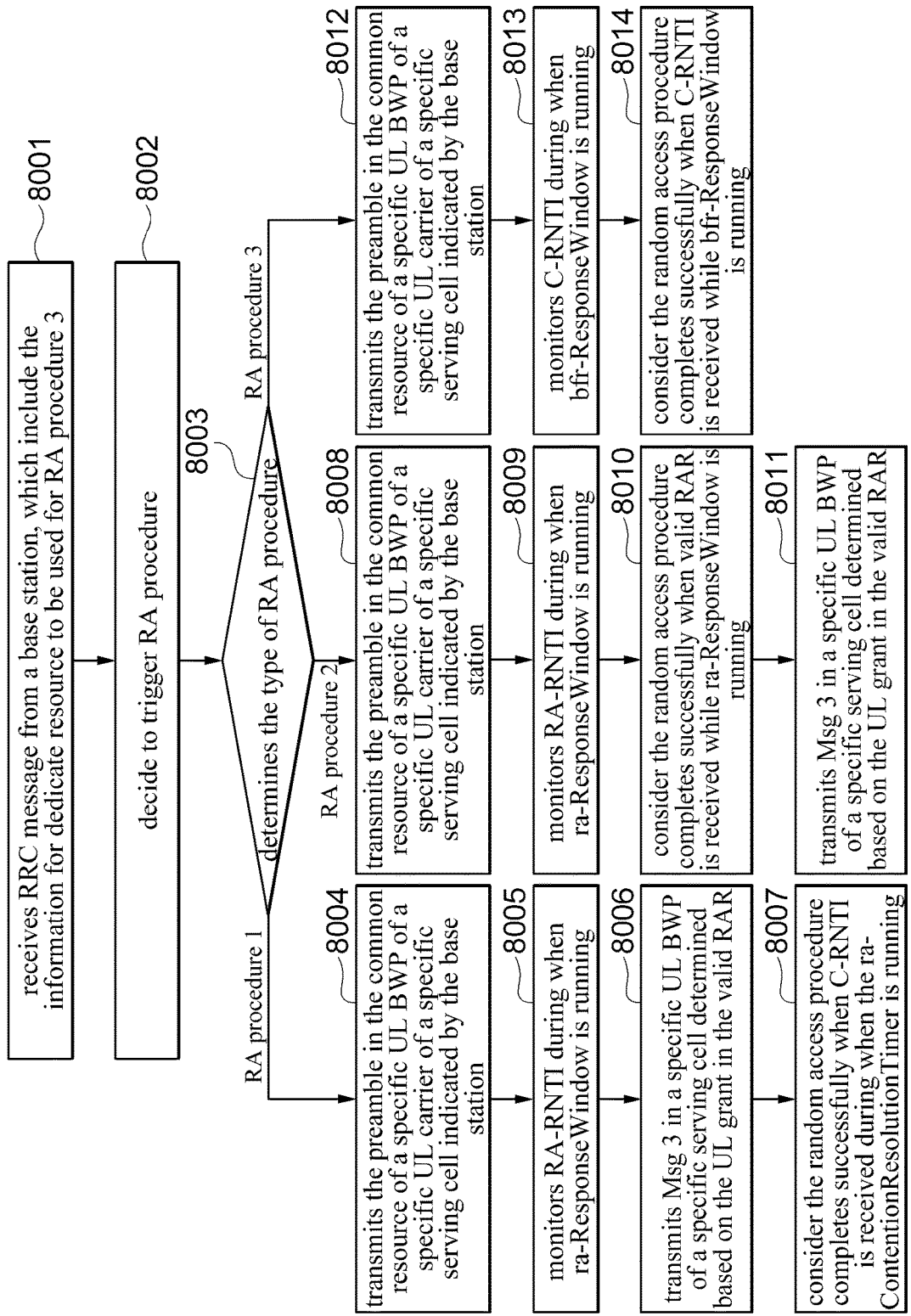
FIG. 8 is the block diagram illustrating various random access procedures of an UE.

FIG. 8 is the block diagram illustrating various random access procedures of an UE.

UE receives RRC message from a base station, which include the information for dedicate resource to be used for RA procedure 3 8001.

UE decide to trigger RA procedure 8002.

UE determines the type of RA procedure 8003. If preamble is selected by MAC, RA procedure 1 is triggered and UE goes to 8004. If dedicate preamble is used and dedicate resource for preamble transmission is not used, RA procedure 2 is triggered and UE goes to 8008. If dedicated preamble and dedicated resource for preamble transmission is used, RA procedure 3 is triggered and UE goes to 8012.

UE transmits the preamble in the common resource of a specific UL BWP of a specific UL carrier of a specific serving cell indicated by the base station 8004. The common resource is the uplink resource indicated in the system information for preamble transmission. The UL BWP is the BWP indicated in the PDCCH order. The UL carrier is either Supplementary UL or Normal UL as indicated in the PDCCH order.

UE monitors RA-RNTI during when ra-ResponseWindow is running 8005.

UE transmits Msg 3 in a specific UL BWP of a specific serving cell determined based on the UL grant in the valid RAR 8006.

UE considers the random access procedure completes successfully when C-RNTI is received during when the ra-ContentionResolutionTimer is running 8007.

UE transmits the preamble in the common resource of a specific UL BWP of a specific UL carrier of a specific serving cell indicated by the base station 8008. The UL BWP is the BWP indicated in the PDCCH order. The UL carrier is either Supplementary UL or Normal UL as indicated in the PDCCH order.

UE monitors RA-RNTI during when ra-ResponseWindow is running 8009.

UE consider the random access procedure completes successfully when valid RAR is received while ra-ResponseWindow is running 8010.

UE transmits Msg 3 in a specific UL BWP of a specific serving cell determined based on the UL grant in the valid RAR 8011.

UE transmits the preamble in the dedicated resource of a specific UL BWP of a specific UL carrier of a specific serving cell indicated by the base station 8012. The dedicated resource is the uplink resource indicated in a RRC message for preamble transmission.

UE monitors C-RNTI during when bfr-ResponseWindow is running 8013.

UE consider the random access procedure completes successfully when C-RNTI is received while bfr-ResponseWindow is running 8014.

Hereinafter RRC messages, terminologies and general procedures that might help readers to understand the disclosure are further explained.

System Information consists of MIB, SIB1, SIB2 and other SIBs.

MIB includes following information: SFN, SCS (sub carrier spacing) for random access and RMSI etc.

SIB1 includes following information: scheduling information for SIBG/SI, value tags for SIBs, Frequency Band Indicator etc. A value tag is indicated for each SIB (except MIB, SIB1 and SIB2). UE determines whether it need to request SIB or not based on the value tag. If the value tag of SIB x indicated in SIB 1 of the serving cell is different from the value tag of SIB x UE currently stores, UE considers SIB x for SI request.

Instead of transmitting individual SIB at a time, a group of SIB s (SIB group or SIBG) is transmitted. SIBG (which can be simply called SI) is used to convey one or more system information blocks. All the SIBs included in a SIBG are transmitted with the same periodicity. SIBG/SI scheduling information includes the periodicity information. The information regarding which SIBG/SI convey which SIBs are also included in SIBG/SI scheduling information.

SIB2 contains radio resource configuration information that is common for all UEs. It includes following information: RACH configuration information, paging configuration information, PDSCH configuration information, PUSCH configuration information etc.

MIB and SIB1 are classified as MSI (Minimum System Information) and transmitted periodically in the predefined frequency location at the predefined time occasion.

SIB 2 is classified as RMSI (Remaining Minimum System Information) and transmitted periodically in the frequency location at the time occasion indicated in MSI.

Other SIBs are classified as OSI (Other System Information) and transmitted when UE request.

BWP is the abbreviation of Bandwidth part. It is introduced to make it possible that a single cell can serve different types of UEs having different bandwidth capabilities.

Figure 9:
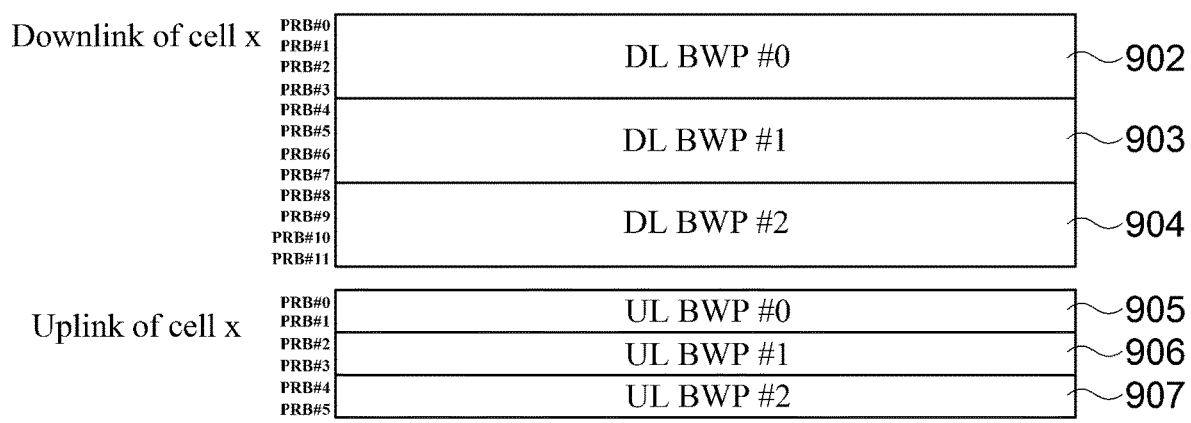
FIG. 9 is a diagram illustrating BWP in a mobile communication system.

In NR, a cell can consist of one or more than one BWPs. BWP is the group of contiguous PRBs. For example, as described in FIG. 9, cell x consists of 3 DL BWPs and 3 UL BWPs. DL BWP #0 (902) consists of PRB #0~PRB #3. DL BWP #1 (903) consists of PRB #4~PRB #7. DL BWP #2 (904) consists of PRB #8~PRB #11. UL BWP #0 (905) consists of PRB #0~PRB #1. UL BWP #1 (906) consists of PRB #2~PRB #3. UL BWP #2 (907) consists of PRB #4~PRB #5.

UE can be configured with multiple BWPs of a serving cell via RRC signaling. In UE perspective, configured BWP can be either in activated state or in deactivated state. Only one BWP can be in activated state for a UE.

Activation/deactivation of BWP can be controlled by DCI. For example, if UE with the DL BWP #0 being currently activated receives DCI scheduling DL PRB of other BWP (e.g. PRB #4), then activated DL BWP of the UE changes from DL BWP #0 to the other DL BWP (DL BWP #1 in this case) Likewise, if UE with the UL BWP #0 being currently activated receive DCI scheduling UL PRB of other BWP (e.g. PRB #4), then activated UL BWP of the UE changes from UL BWP #0 to the other UL BWP (UL BWP #2 in this case).

In FDD, DL BWP and UL BWP are switched independently e.g. when DL BWP #0 and UL BWP #0 are the activated BWPs for the UE at a certain point of time, activated DL BWP can be switched to e.g. DL BWP #2 while activated UL BWP is kept same.

In TDD and for limited capability UEs, switching DL BWP and UL BWP together is more beneficial. In TDD, DL and UL are used in the same frequency region, hence if DL BWP and UL BWP does not change together, UE may be required to change its RF upon every DL-UL change or UL-DL change.

The decision whether to associate a certain DL BWP and a certain UL BWP and to manage them together (e.g. switch them together) or to handle DL BWP and UL BWP independently should be made by GNB taking UE RF capability into account. It is also related with which FBG the serving cell's FB belongs to (e.g. whether the serving cell is the FDD cell or TDD cell).

FBG is the abbreviation of Frequency Band Group. FBG1 is the group of FDD bands. FBG2 is the group of TDD bands.

DCI is the abbreviation of Downlink Control Information. It is interchangeable with PDCCH (Physical Downlink Control Channel).

IE is Information Element and refer to the information included in the RRC message.

RRC connection request message include following information elements: UE identity allocated by MME/AMF and establishment cause.

RRC connection setup message include following information elements: SRB1 configuration information, BWP configuration information(s) and other information necessary for UE and GNB to transmit and receive RRC messages.

RRC connection reconfiguration message include following information elements: SRB2 configuration information, DRB configuration information, BWP configuration information(s), DRX configuration, SPS configuration and other information necessary for UE and GNB to transmit and receive DRB efficiently.

BWP information for FBG 1 include initial BWP id, default BWP id, multiple of DL BWP information (s) and multiple of UL BWP information (s). If only initial BWP id is included, default BWP is same as initial BWP. If only default BWP id is included, initial BWP is same as default BWP. If neither default BWP id nor initial BWP id is included, BWP with BWP id 0 (or BWP with the lowest BWP id) is the default BWP and initial BWP. When a RRC message configured multiple BWPs, UE starts with the initial BWP and switch to other BWPs by GNB control. Upon certain event (like expiry of certain timer), UE switches to the default BWP.

BWP information for FBG 2 includes initial BWP id, default BWP id and multiple of DL BWP information (or common BWP information).

DL BWP information consists of following information: BWP id, SCS, frequency domain location of the BWP (e.g. ARFCN indicating the center frequency of the BWP or PRB index/id of the center PRB), bandwidth of the BWP (e.g. the number of PRB).

UL BWP information consists of following information: BWP id, SCS, frequency domain location, bandwidth.

initial access BWP information is provided in the system information. UE use the initial access BWP until dedicate BWP is configured. dedicate BWP information is provided in the RRC control message. When dedicate BWP(s) are configured, UE start using initial BWP. When GNB instruct UE to switch the BWP, UE stops using (or deactivate) the initial BWP and start using (or activate) the indicated BWP. When BWP timer expires, UE switch to the default BWP (e.g. stop using the current BWP and start using the default BWP).

SPS configuration information consists of three parts; common configuration information, DL SPS configuration information and UL SPS configuration information. Common configuration information that is applicable for both DL SPS and UL SPS. Common configuration information includes the information like SPS C-RNTI and the information to which serving cell the SPS configuration is applicable. DL SPS configuration includes the number of DL HARQ process that can be used for DL SPS and DL SPS periodicity. UL SPS configuration includes the number of UL HARQ processes that can be used for UL SPS and UL SPS periodicity.

C-RNTI is UE identity uniquely identifying UE in a given cell and used for dynamic scheduling.

SPS C-RNTI is used to activate or release SPS and different from C-RNTI (can be considered as additional C-RNTI for SPS scheduling). It can be called by different names (e.g. other than SPS C-RNTI)

DL SPS resource can be called configured downlink assignments.

UL SPS resource can be called configured uplink grant.

UL SPS can be called uplink transmission without grant or grant free transmission.

DL SPS activation (that SPS is activated) can be same as configured downlink assignment initialization (configured downlink assignment is initialized)

UL SPS activation (that SPS is activated) can be same as configured uplink grant initialization (configured uplink grant is initialized)

DL SPS deactivation (that SPS is deactivated) can be same as configured downlink assignment release (configured downlink assignment is released)

UL SPS deactivation (that SPS is deactivated) can be same as configured uplink grant release (configured uplink grant is released)

DL SPS or UL SPS is activated or deactivated by receiving PDCCH/DCI for UE's SPS C-RNTI.

In the disclosure, 'indicating A in a RRC message' can be same as 'instructing A'' or 'commanding A'', while A' is the action corresponding to A.

In the disclosure, 'receiving A in a RRC message' can be same as 'doing A' as a result of receiving the RRC message and decoding A'.

UL SPS activation command is the PDCCH/DCI for SPS C-RNTI indicating to activate configured uplink grant.

The SPS confirmation MAC control element is identified by a MAC PDU subheader with a specific LCID and has fixed size of zero bits (e.g. it is MAC subhead only MAC CE). By receiving SPS confirmation MAC Control Element, GNB knows that the SPS activation/deactivation is successful.

LTE DRX configuration information consists of following information. onDurationTimer, inactivityTimer, Long-DRX cycle, Short-DRX cycle, DRX start offset, retransmissionTimer and UL retransmissionTimer.

LTE DRX operation is as following. UE and ENB determines the starting subframe of on-Duration based on the DRX cycle and DRX start offset. UE and ENB starts onDuration and monitor PDCCH. If new transmission is scheduled, UE and ENB start inactivityTimer which is restarted when new transmission is scheduled. retransmissionTimer and UL retransmissionTimer are for retransmission to be scheduled. They start when HARQ RTT timer or UL HARQ RTT timer expires and stops when corresponding retransmission is scheduled. HARQ RTT timer and UL HARQ RTT timer start when DL assignment or UL grant is received.

NR configuration information consist of following information. NR serving cell configuration such as the center frequency of the serving cell, serving cell index; Bearer configuration such as NR PDCP configuration and NR RLC configuration; NR DRX configuration.

NR DRX configuration information consists of following information. NR onDurationTimer, NR inactivityTimer, NR Long-DRX cycle, NR Short-DRX cycle, NR DRX start offset, NR retransmissionTimer, NR UL retransmissionTimer, NR HARQ RTT timer and NR UL HARQ RTT timer.

PHR configuration consist of following information: A timer value for periodic reporting, a timer value to prohibit too frequent reporting and pathloss change threshold etc.

SCell configuration consist of following information: center frequency of the SCell, BWP information, SCellIndex etc.

Supplemental uplink configuration consist of following information: center frequency of the supplemental uplink, associated serving cell (if absent, the SUL is associated with PCell downlink), uplinkIndex etc. associated serving cell is indicated by SCellIndex, and the SUL is associated with the DL of the indicated serving cell. Being associated with DL of a serving cell means that pathloss of the serving cell is used in calculating the uplink transmission power, and PDCCH/DCI for the SUL can be transmitted from the associated serving cell.

TAG is the Timing Advance Group. Timing Advance Group is a group of Serving Cells that is configured by RRC and that, for the cells with an UL configured, using the same timing reference cell and the same Timing Advance value. A Timing Advance Group containing the SpCell of a MAC entity is referred to as PTAG, whereas the term STAG refers to other TAGs.

The SCell Activation/Deactivation MAC CE (A/D MAC CE) of one octet is identified by a MAC PDU subheader with LCID. It has a fixed size and consists of a single octet containing seven C-fields and one R-field.

Ci: if there is an SCell configured with SCellIndex i as specified in TS 38.331 [8], this field indicates the activation/deactivation status of the SCell with SCellIndex i, else the MAC entity shall ignore the Ci field. The Ci field is set to "1" to indicate that the SCell with SCellIndex i shall be activated. The Ci field is set to "0" to indicate that the SCell with SCellIndex i shall be deactivated;

R: Reserved bit, set to "0".

The Timing Advance Command MAC CE is identified by MAC PDU subheader with LCID. It has a fixed size and consists of a single octet defined as follows.

TAG Identity (TAG ID): This field indicates the TAG Identity of the addressed TAG. The TAG containing the SpCell has the TAG Identity 0. The length of the field is 2 bits;

Timing Advance Command: This field indicates the index value TA (0, 1, 2 . . . 63) used to control the amount of timing adjustment that MAC entity has to apply (as specified in TS 38.213 [6]). The length of the field is 6 bits.

Multiple OFDM numerologies as given by Table 1 below are supported in NR.

TABLE 1

| mu | Sub-Carrier Spacing (delta f) |
|---|---|
| 0 | 15 |
| 1 | 30 |
| 2 | 60 |
| 3 | 120 |
| 4 | 240 |

Meanwhile, the method and apparatus to receive and transmit data in a mobile communication system according to various exemplary embodiments of the present invention described above may be implemented in an installation data form and be provided in servers or devices in a state in which it is stored in various non-transitory computer readable media. Therefore, the respective apparatuses may access the servers or the devices in which the installation data are stored to download the installation data.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

Abbreviation
AM DRB Acknowledged Mode Data Radio Bearer
ARFCN Absolute Radio Frequency Channel Number
BS Buffer Status
BSR Buffer Status Report
BWP Bandwidth Part
CCCH Common Control Channel
CR Contention Resolution
C-RNTICell Radio Network Temporary Identifier
DCI Downlink Control Information
DL Downlink
DRX Discontinuous Reception
eMBB enhanced Mobile Broadband
E-UTRAN Evolved Universal Terrestrial Radio Access Network
FB Frequency Band
FBG Frequency Band Group
FBI Frequency Band Indicator
FMC First Missing Count
GNB next Generation Node B
HARQ Hybrid Automatic Retransmission reQuest
HO Handover
LCH Logical Channel
LCID Logical Channel ID
LCP Logical Channel Prioritization
MAC Medium Access Control
MAC CE MAC Control Element
MCS Modulation Coding Scheme
MeNB Master eNode B
MME Mobility Management Entity
MSB Most Significant Bit
MSI Minimum System Information
NR Next Radio
PCell Primary Cell
PDCCH Physical Downlink Control Channel
PDCP Packet Data Convergence Protocol
PDSCH Physical Downlink Shared Channel
PDU Protocol Data Unit
PRB Physical Resource Block
PSS/SSS Primary Synchronization Signal/Secondary Synchronization Signal
PUSCH Physical Uplink Shared Channel
RA Random Access
RAR Random Access Response
RAT Radio Access Technology
RB Radio Bearer
RLC Radio Link Control
RLF Radio Link Failure RMSI Remaining Minimum System Information
RRC Radio Resource Control
RSRP/RSRQ Reference Signal Received Power/Reference Signal Received Quality
RTT Round Trip Time
RV Redundancy Version
Scell Secondary cell
SCS Sub Carrier Spacing
SDAP Service Data Adaptation Protocol
SDU Service Data Unit
SgNB Secondary gNode B
SIB System Information Block
SIBG System Information Block Group
SPS Semi-Persistent Scheduling
SRB Signaling Radio Bearer
SRS Sounding Reference Signal
S-TMSI SAE-Temporary Mobile Subscriber Identity
SUL Supplemental Uplink
TA Timing Advance
TAC Timing Advance Command
TB Transport Block
TTI Transmission Time Interval
UE User Equipment; interchangeable with Terminal
UL Uplink
UM DRB Unacknowledged Mode Data Radio Bearer
URLLC Ultra Reliable Low Latency

What is claimed is:

1. A method by a terminal, the method comprising:
receiving, from a base station, a system information including information on a sub-carrier spacing (SCS) for Msg 3 transmission;
receiving, from the base station, a control message including information on a SCS of uplink bandwidth (UL BWP) part for secondary cell;
receiving, from the base station, Timing Advance Command (TAC) including Timing Advance (TA) value;
determining whether the TAC is received in a random access response or received in a TAC medium access control (MAC) control element (CE);
determining a number to derive an amount of timing adjustment (N_TA) using a $1^{st}$ method if the TAC is received in the random access response; and
determining N_TA using a $2^{nd}$ method if the TAC is received in the TAC MAC CE,
wherein in the $1^{st}$ method N_TA is determined by the TA value in the TAC and a SCS of a specific UL BWP,
wherein in the $2^{nd}$ method N_TA is determined by the TA value in the TAC and SCSs of a specific group of UL BWPs.

2. The method of claim 1, wherein the specific UL BWP in the $1^{st}$ method is a UL BWP where uplink transmission for Msg 3 occurs according to an uplink grant included in the random access response.

3. The method of claim 1, wherein the specific group of UL BWPs in the $2^{nd}$ method are active UL BWPs of all the active serving cells of a Timing Advance Group (TAG) at the time when TAC is received.

4. The method of claim 1, wherein in the $1^{st}$ method a Timing Advance Group (TAG) where the determined N_TA is applied is a TAG of a serving cell where random access is performed.

5. The method of claim 1, wherein in the $2^{nd}$ method a Timing Advance Group (TAG) where the determined N_TA is applied is a TAG indicated by a TAG id in the received TAC MAC CE.

6. A terminal in a wireless communication system, the terminal comprising:
a transceiver configured to transmit and receive a signal; and
a controller configured to control the transceiver to:
receive, from a base station, a system information including information on a sub-carrier spacing (SCS) for Msg 3 transmission;
receive, from the base station, a control message including information on a SCS of uplink bandwidth (UL BWP) part for secondary cell;
receive, from the base station, Timing Advance Command (TAC) including Timing Advance (TA) value;
determine whether the TAC is received in a random access response or received in a TAC medium access control (MAC) control element (CE);
determine a number to derive an amount of timing adjustment (N_TA) using a $1^{st}$ method if the TAC is received in the random access response; and
determine N_TA using a $2^{nd}$ method if the TAC is received in the TAC MAC CE,
wherein in the $1^{st}$ method N_TA is determined by the TA value in the TAC and a SCS of a specific UL BWP,
wherein in the $2^{nd}$ method N_TA is determined by the TA value in the TAC and SCSs of a specific group of UL BWPs.

7. The terminal of claim 6, wherein the specific UL BWP in the $1^{st}$ method is a UL BWP where uplink transmission for Msg 3 occurs according to an uplink grant included in the random access response.

8. The terminal of claim 6, wherein the specific group of UL BWPs in the $2^{nd}$ method are active UL BWPs of all the active serving cells of a Timing Advance Group (TAG) at the time when TAC is received.

9. The terminal of claim 6, wherein in the $1^{st}$ method the TAG a Timing Advance Group (TAG) where the determined N_TA is applied is a TAG of a serving cell where random access is performed.

10. The terminal of claim 6, wherein in the $2^{nd}$ method a Timing Advance Group (TAG) where the determined N_TA is applied is a TAG indicated by a TAG id in the received TAC MAC CE.

* * * * *